(12) United States Patent
Ohashi

(10) Patent No.: US 7,322,006 B1
(45) Date of Patent: Jan. 22, 2008

(54) INTEGRATED DOCUMENT MANAGEMENT SYSTEM, DOCUMENT RETRIEVAL DEVICE, AND A COMPUTER-READABLE RECORDING MEDIUM WITH A DOCUMENT RETRIEVAL PROGRAM RECORDED THEREIN

(75) Inventor: Tadashi Ohashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/472,062

(22) Filed: Dec. 23, 1999

(30) Foreign Application Priority Data

May 10, 1999 (JP) ................................. 11-128574

(51) Int. Cl.
G06F 15/00 (2006.01)
G06F 17/30 (2006.01)
H04L 9/00 (2006.01)

(52) U.S. Cl. .................... 715/511; 715/501.1; 715/513; 715/526; 707/3; 707/10; 713/166

(58) Field of Classification Search ................ 715/511, 715/514, 501.1, 513; 707/203, 10, 200, 3, 707/5, 100, 205; 717/122; 713/161, 166, 713/167

See application file for complete search history.

(56) References Cited

U.S. PATENT DOCUMENTS

| | | | | |
|---|---|---|---|---|
| 5,239,647 A | * | 8/1993 | Anglin et al. | 707/205 |
| 5,819,295 A | * | 10/1998 | Nakagawa et al. | 707/203 |
| 5,893,114 A | * | 4/1999 | Hashimoto et al. | 707/200 |
| 6,014,677 A | * | 1/2000 | Hayashi et al. | 707/104.1 |
| 6,014,680 A | * | 1/2000 | Sato et al. | 715/513 |
| 6,044,384 A | * | 3/2000 | Ishima et al. | 715/517 |
| 6,061,697 A | * | 5/2000 | Nakao | 715/513 |
| 6,134,552 A | * | 10/2000 | Fritz et al. | 707/10 |
| 6,167,448 A | * | 12/2000 | Hemphill et al. | 709/224 |
| 6,314,425 B1 | * | 11/2001 | Serbinis et al. | 707/10 |
| 6,457,017 B2 | * | 9/2002 | Watkins et al. | 707/103 R |

(Continued)

FOREIGN PATENT DOCUMENTS

| | | |
|---|---|---|
| JP | 3-161864 | 7/1991 |

(Continued)

OTHER PUBLICATIONS

Andrew V. Royappa, "Implementing Catalog Clearinghouses with XML and XSL", Department of Computer Science, ACM, 1998, pp. 616-623.*

(Continued)

*Primary Examiner*—William Bashore
*Assistant Examiner*—Maikhanh Nguyen
(74) *Attorney, Agent, or Firm*—Staas & Halsey LLP

(57) ABSTRACT

An integrated document management system comprises a storage unit which stores therein a document database consisting of a plurality of documents based on a hierarchical structure and a management information database consisting of a information indicating a relation between a document in an upper layer and a document in a lower layer and a plurality of management information including information on a version number of each document. A server is connected to the storage unit and is provided with the manager of the documents. A client is connected via a network to the server and retrieves, by accessing the server, a document in the upper layer and a document in the lower layer each having a specified version number according to the management information.

10 Claims, 26 Drawing Sheets

U.S. PATENT DOCUMENTS

| | | | |
|---|---|---|---|
| 6,477,528 B1 * | 11/2002 | Takayama | 707/5 |
| 6,493,732 B2 * | 12/2002 | Aoyama et al. | 715/511 |
| 6,526,406 B1 * | 2/2003 | Suzuki et al. | 707/10 |
| 6,552,814 B2 * | 4/2003 | Okimoto et al. | 358/1.13 |
| 6,584,466 B1 * | 6/2003 | Serbinis et al. | 707/10 |
| 6,631,495 B2 * | 10/2003 | Kato et al. | 715/500 |
| 6,635,088 B1 * | 10/2003 | Hind et al. | 715/513 |
| 6,662,182 B1 * | 12/2003 | Lerenc et al. | 707/10 |
| 6,782,387 B1 * | 8/2004 | Kumashio | 707/10 |
| 6,912,529 B1 * | 6/2005 | Kolfman | 707/10 |
| 6,922,697 B1 * | 7/2005 | Suehira | 707/102 |

FOREIGN PATENT DOCUMENTS

| | | |
|---|---|---|
| JP | HEI 6-243018 A | 9/1994 |
| JP | 7-271850 | 10/1995 |
| JP | HEI 10-283235 A | 10/1998 |
| JP | HEI 11-3357 A | 1/1999 |
| JP | HEI 11-15724 A | 1/1999 |
| JP | 11-110391 | 4/1999 |

OTHER PUBLICATIONS

Tommie Usdin et al., "XML: Not a Silver Bullet, But a Great Pipe Wrench", Mulberry Technologies, Inc., Rockvile, MD, StandardView vol. 6, No. 3, Sep. 1998, pp. 125-132.*

Usdin et al. "XML: Not a Silver Bullet, But a Great Pipe Wrench", StandardView vol. 6, No. 3, Sep. 1998.*

* cited by examiner

FIG.5

FILE NAME : CA41205-2449.xml    $F_{XML}$

⟨MANAGEMENT INFORMATION⟩
⟨DESIGNING DEPARTMENT CODE⟩ 14321 ⟨/DESIGNING DEPARTMENT CODE⟩
⟨DESIGNER⟩ TADASHI OHASHI ⟨/DESIGNER⟩
⟨TELEPHONE⟩ 71124462 ⟨/TELEPHONE⟩
⟨DRAWING NUMBER⟩ CA41205-2449 ⟨/DRAWING NUMBER⟩
⟨RESULT OF PERTINENCE DETERMINATION⟩ VS
    ⟨/RESULT OF PERTINENCE DETERMINATION⟩
⟨PERTINENCE DETERMINATION SURVEYOR⟩ TADASHI OHASHI
    ⟨/PERTINENCE DETERMINATION SURVEYOR⟩
⟨PERTINENCE DETERMINATION APPROVER⟩ TADASHI OHASHI
    ⟨/PERTINENCE DETERMINATION APPROVER⟩
⟨IMPORTANCE DEGREE⟩ VH ⟨/IMPORTANCE DEGREE⟩
⟨ECO/NRN⟩ F2224Z2411 ⟨/ECO/NRN⟩
⟨DRAWING⟩ CA41205-2449-01.ps ⟨/DRAWING⟩
⟨DRAWING⟩ CA41205-2449-02.ps ⟨/DRAWING⟩
⟨DRAWING⟩ CA41205-2449-03.ps ⟨/DRAWING⟩
⟨DESTINATION FOR PRESENTATION⟩ COMPANY XXYYZZ
    ⟨/DESTINATION FOR PRESENTATION⟩
⟨LANGUAGE CLASSIFICATION⟩ AMERICAN ⟨/LANGUAGE CLASSIFICATION⟩
⟨HISTORY⟩
    ⟨DATE OF ISSUE⟩ AUG.21.1998 ⟨/DATE OF ISSUE⟩
    ⟨VERSION NUMBER⟩ 01 ⟨/VERSION NUMBER⟩
    ⟨ARTICLE⟩ PUBLICATION OF AN INITIAL VERSION ⟨/ARTICLE⟩
    ⟨DATE OF ISSUE⟩ JUN.01.1999 ⟨/DATE OF ISSUE⟩
    ⟨VERSION NUMBER⟩ 02 ⟨/VERSION NUMBER⟩
    ⟨ARTICLE⟩ A PART OF P-4 WAS AMENDED. ⟨/ARTICLE⟩
⟨/HISTORY⟩
⟨DESTINATION FOR DISTRIBUTION⟩
    ⟨IN-HOUSE⟩ ONLY DESIGNING DEPARTMENT ⟨/IN-HOUSE⟩
    ⟨OUTSIDE⟩ COMPANY A ⟨/OUTSIDE⟩
    ⟨OUTSIDE⟩ COMPANY B ⟨/OUTSIDE⟩
    ⟨OUTSIDE⟩ COMPANY C ⟨/OUTSIDE⟩
⟨/DESTINATION FOR DISTRIBUTION⟩
⟨/MANAGEMENT INFORMATION⟩

FIG.7

USE REGISTRATION MENU

- USER NAME
- USER'S POSITION
- PASSWORD
- CONFIRMATION
- SURVEYOR ? (Y/N)
- APPROVER ? (Y/N)
- PERTINENCE DETERMINATION SURVEYOR ? (Y/N)
- PERTINENCE DETERMINATION APPROVER ? (Y/N)

—MENU—
- ■ USER REGISTRATION
- ☐ DOCUMENT REGISTRATION
- ☐ UPDATING
- ☐ ABORTION OF A DRAWING
- ☐ ACKNOWLEDGEMENT
- ☐ PERTINENCE DETERMINATION
- ☐ DISTRIBUTION
- ☐ RECEPTION
- ☐ COPY

FIG.22

| DESTINATION FOR PRESENTATION | LANGUAGE CLASSIFICATION |
|---|---|
| COMPANY XXYYZZ | GERMAN |
| COMPANY AABBCC | ENGLISH |
| COMPANY DDEEFF | JAPANESE |
| ⋮ | ⋮ |

FIG.23

| ITEM | NAME OF A SLAVE DRAWING | DRAWING NUMBER | VERSION NUMBER | FILE FORMAT | EC NUMBER |
|---|---|---|---|---|---|
| 1 | LOGIC CIRCUIT DIAGRAM | ***** | ** | .pdf | ******* |
| 2 | PRINTED BOARD PACKING DIAGRAM | ***** | ** | .pdf | ******* |
| 3 | COMPONENT DIAGRAM | ***** | ** | .exl | ******* |
| 4 | PRINTED BOARD AND DEVICE PACKING STRUCTURE VIEW | ***** | ** | .ps | ******* |
| 5 | FIRMWARE | ***** | ** | .exe | ******* |
| 6 | PURCHASE SPECIFICATION | ***** | ** | .doc | ******* |
| 7 | TEST SPECIFICATION | ***** | ** | .oa2 | ******* |
| 8 | ASSEMBLY SPECIFICATION | ***** | ** | .tif | ******* |

# INTEGRATED DOCUMENT MANAGEMENT SYSTEM, DOCUMENT RETRIEVAL DEVICE, AND A COMPUTER-READABLE RECORDING MEDIUM WITH A DOCUMENT RETRIEVAL PROGRAM RECORDED THEREIN

FIELD OF THE INVENTION

The present invention relates to an integrated document management system which manages a plurality of documents to be distributed to the users, a document retrieval device used therein, and a computer-readable recording medium with a document retrieval program recorded therein. More specifically, this invention relates to an integrated document system which does not require manual management of documents and a document retrieval device used therein, and a computer-readable recording medium with a document retrieval program recorded therein.

BACKGROUND OF THE INVENTION

In recent years, in association with an increase in the volume of the information transacted inside or outside a business organization, types and a number of paper documents (such as texts, and drawings) created in a company (or in a department of the company) has increased. Accordingly, the time required for management of the various types of paper documents and a cost required for the management is also increasing. Especially, in management of drawings for designing or the like, there are a plurality of types of drawing for one product, and also there exist a number of drawings for each version, so that the management work becomes inevitably complicated. Under the circumstances as described above, in the industries, a technology for efficiently managing documents without requiring a long period of time and an excessive burden on the operator has been desired.

FIG. 26 is a view showing a method of managing the documents based on the conventional technology. In the following description, a draft drawing is taken as an example of a paper document, and a method of managing the draft drawing is described. More specifically, a case where a plurality of draft drawings prepared in a design department 20 are registered and then a desired draft drawing is retrieved from the plurality of draft drawings and is distributed to a user or users (to a plant) is described. The draft drawing is a generic term indicating a collection of a device drawing 1 up to a test specification 9.

In FIG. 26, the design department 20 is a department in a company in which draft drawings for various types of apparatuses are created. The draft drawings created in this design department 20 include a device drawing 1, a device configuration table 2, a master component table 3, a slave component drawing 4, a logic circuit diagram 5, a printed board packing diagram 6, a purchase specification 7, a printed board/device assembly specification 8, and a test specification 9. The device drawing 1 is a master drawing indicating the general configuration of the device or the like. The device configuration table 2 is a list showing the components of the device. The master component table 3 is a list of components used as the components, and is prepared for each component. The slave component drawing 4 is a drawing showing the configuration of a component described in the master component table 3. The slave component drawing 4 is prepared for each component described in the master component table 3.

The logic circuit diagram 5 is a diagram showing a logic circuit in the device. The printed board packing diagram 6 is a diagram showing a packing state when each component is packed on the printed board. The purchase specification 7 is a document showing specifications for purchasing each component used in the device. The printed board/device assembly specification 8 is a document showing the specifications for assembly of the printed board and the device. The test specification 9 is a document showing the specifications of various types of test such as that for checking an assembled product.

The above-described device drawing 1, device configuration table 2, master component table 3, slave component drawing 4, logic circuit diagram 5, printed board packing diagram 6, purchase specification 7, printed board/device assembly specification 8, and test specification 9 are put under management in relation to a version number and are prepared for each version number. Causes for version updating includes errors in designing, changes in designed specifications, or the like. A drawing distribution destination list 10, which is issued by the design department 20, shows destinations (users, plants) for distribution of the device drawing 1 and device configuration table 2 or the like.

A method of registering the draft drawings in a document management department is described below. This document management department is a department which is responsible for the storage of the draft drawings, management of version numbers, and distribution of documents. When a designing step 21a for the device drawing 1 is finished in the design department 20, a responsible person in the design department 20 registers (21b) the device drawing 1 in the document management department and also specifies (21c) destinations for distribution of the device drawing 1. With this operation, the device drawing 1 is stored at a specified site, and the destinations for distribution of the device drawing 1 are written in the drawing distribution destination list 10.

When the need for updating (21d) is generated for a change in design or for other reasons, the responsible person in the design department 20 registers (21b) the updated device drawing 1, and specifies (21c) destinations for distribution of the updated device drawing 1. With this operation, the updated device drawing 1 is stored together with the device drawing 1 with a previous number at a specified site, and destination for distribution of the updated device drawing 1 is written in the drawing distribution destination list 10.

Registration of the device configuration table 2 is carried out in the same manner as the registration of the device drawing 1 described above. Namely when the device configuration table 2 is designed (22a), registration (22b) and specification of destination for distribution (22c) are executed, and then the device configuration table 2 is stored at a specified site and the destinations are written in the drawing distribution destination list 10. Similarly, when the device configuration table 2 is to be updated (22d), registration (22b) and specification of destinations for distribution (22c) are executed, and the updated device configuration table 2 is stored at a specified site, and the destinations for distribution of the updated device configuration table 2 are written in the drawing distribution destination list 10. A responsible person in the design department 20 carries out registration and specification of the destinations for the distribution each time each of the master component table 3 up to the test specification 9 are prepared, or each time the documents are updated.

A method of distributing a document in the document management department is described below. At first, in step SA1, a responsible person in the document management department retrieves the device drawing 1 for a device from a number of draft drawings according to a drawing number corresponding to the device, prepares copies of the device drawing 1, and then carries out the processing in step SA2. In step SA2, the responsible person retrieves, prepares copies of the device configuration table 2, and then carries out the processing in step SA3. In step SA3, the responsible person retrieves and copies a plurality of required master component table 3, and then carries out the processing in step SA4.

In step SA4, the responsible person retrieves a plurality of required slave component drawings 4 by visually checking the master component table 3, prepares copies of the drawings, and then carries out the processing in step SA5. In this case, the responsible person carries out a job for retrieving a plurality of slave component drawings 4 corresponding to a number of copies of the master component table 3, and also carries out a job for copying the documents. Subsequently, in steps SA5 to SA9, the responsible person retrieves and copies the logic circuit diagram 5, printed board packing diagram 6, purchase specification 7, printed board/device assembly specification 8, and test specification 9 respectively.

Further in step SA10, the responsible person retrieves the drawing distribution destination list 10, and then carries out the processing in step SA11. In step SA11, the responsible person separates the device drawing 1 up to the test specification 9 (copies) for each device, each user (plant), and for each device while version for each device visually checking the drawing distribution destination list 10, and sends the documents to each user (each plant).

It is mentioned above that distribution of documents which is executed according to steps SA1 to SA11 in as shown is performed in the conventional technology. However, the actual work for distribution is not so simple, and experience and sophisticated knowledge is required, so that a substantially high-level skill is required.

Namely, in the conventional technology, a responsible person is required to manually retrieve a desired paper drawing from a vast amount of draft drawings according to a drawing number of the device. Further, only a skilled person can execute the work of classifying the documents according to a device, a user, and a version number, and the distribution of documents. Further, when a draft drawing is sent to a user (plant) abroad, it is required to retrieve the draft drawing based on the determination as to whether distribution of the draft drawing is allowable under restrictions by the Export Control Law or Foreign Exchange Law, so that a substantially wide range of knowledge concerning laws is required.

Further each time any portion of a draft drawing is amended, added, or deleted to correct an error in designing or change the design, the draft drawing is updated. Thus, a responsible person is required to also grasp information concerning updates when retrieving a draft drawing, which means an increase of burden on the person. Further, conventionally, the destinations for the distribution of a draft drawing is managed by referring to the drawing distribution destination list 10, but when the destinations for the distribution of the drawing are frequently changed according to the user's convenience, information concerning change in destinations for distribution of the draft drawing is not correctly reflected to the drawing distribution destination list 10, and sometimes an error may occur in distribution.

As described above, conventionally, as paper-based documents (such as draft drawings) are manually managed by persons, a great amount of time and work load is required for this management. Further, a disadvantageously long time is required when a user requests distribution of a draft drawing until he/she receives the draft drawing.

SUMMARY OF THE INVENTION

It is an object of the present invention to provide an integrated document management system which makes it possible for users to accurately and quickly obtain a required document without the needs for manual document management, a document retrieval device used in the system, and a computer-readable recording medium with a document retrieval program recorded therein.

In the integrated document management system according to one aspect of this invention, a plurality of documents to be retrieved by a user and management information for the plurality of documents (information indicating correspondence among the documents, and information concerning a version number of each document) are stored in a document database and a management information database respectively. When a client accesses a server via a network, management information concerning the desired document is read out from the management information database, and further a document having a specified version number is hierarchically read out from the document database according to the information on correspondence and the version number obtained from the management information.

Thus, information concerning correspondence among documents and information on a version number of each document are included in management information. A plurality of such documents are registered in the document database. Documents required by a user are retrieved as a plurality of documents forming a hierarchical structure in the client side according to the management information. Therefore the need for manual operations for management of documents as required in the conventional technology is eliminated and a required draft drawing can accurately and quickly be obtained through a network.

Further, the management information includes information concerning a collection of a plurality of documents each belonging to the same layer and information concerning a version number of each of the plurality of documents. When a client accesses a server via a network, management information for one layer is read out from the management information database. Further, a plurality of documents belonging to the layer are retrieved from the document database according to the information concerning a collection of a plurality of documents belonging to the same layer and information on a version number of each document obtained from the management information. Thus, not only that the a document out of the documents that form the hierarchical structure can be retrieved, but also a single document out of the documents in the same layer can accurately and quickly be acquired.

Further, each time a document is updated, documents relating to the document and stored in the document database and management information concerning the documents are registered and updated. Thus, the work of updating the document, which has been difficult in the conventional technology, can accurately and quickly be carried out. Therefore, document retrieval can always be executed based on the latest version number.

Further, the client sends the information required for the retrieval to the server. On the other hand, when a document is updated, the server sends the information concerning such update to the client. Therefore, the client can immediately acquire information on updating information concerning a retrieved document, so that an updated document can accurately and quickly be obtained.

Further, information concerning a security level is included in management information. Therefore document retrieval can be permitted to some users and at the same time can be inhibited to other users according to the security level, so that a system with high security can be obtained.

In the document retrieval device according to an another aspect of this invention, information indicating correspondence among documents and information concerning a version number of each document are included in management information, a plurality of such documents are registered in the document database, and documents required by a user are retrieved as a plurality of documents forming a hierarchical structure according to the management information. Thus, the manual work required for document management as required in the conventional technology is not necessary. Therefore, a document can accurately and quickly be acquired via a network.

Further, when a user accesses a server via the network, management information for one layer is read out from the management information database. A plurality of documents belonging to the layer are read out from the document database according to information concerning a collection of documents on the same layer as well as to information concerning a version number of each document obtained from the management information. Thus, not only that the a document out of the documents that form the hierarchical structure can be retrieved, but also a single document out of the documents in the same layer can accurately and quickly be acquired.

Further, information concerning a security level is included in the management information. Therefore, document retrieval can be permitted to some users and at the same time can be inhibited to other users according to a security level, so that a system with high security can be obtained.

In the recording medium according to still another aspect of this invention, information concerning correspondence among documents and information concerning a version number of each document are included in management information, a plurality of documents are registered in a document database, and documents required by a user are retrieved as a plurality of documents forming a hierarchical structure according to the management information. Therefore, a manual work for document management as required in the conventional technology is not necessary and a document can accurately and quickly be acquired via a network.

Further, when a client accesses a server via a network, management information concerning one layer is read out from the management information database. A plurality of documents belonging to the layer are retrieved from the document database according to information concerning a collection of documents on the same layer as well as to information concerning a version number of each document obtained from the management information. Thus, not only that the a document out of the documents that form the hierarchical structure can be retrieved, but also a single document out of the documents in the same layer can accurately and quickly be acquired.

Further, information concerning a security level is included in the management information, and document retrieval can simultaneously be permitted to some users and inhibited to other users according to a security level, so that a system insuring high security can be obtained.

Other objects and features of this invention will become apparent from the following description with reference to the accompanying drawings.

BRIEF DESCRIPTION OF THE DRAWINGS

FIG. 5 is a view showing one example of an XML file $F_{XML}$ in this embodiment;

FIG. 7 is a view showing one example of an XML browser menu screen in this embodiment;

FIG. 22 is a view showing an example of presentation language list in the embodiment;

FIG. 23 is a view showing an example of a slave SK list in this embodiment;

DESCRIPTION OF THE PREFERRED EMBODIMENTS

A preferred embodiment of an integrated document management system, a document retrieval device, and a computer-readable recording medium with a document retrieval program recorded therein each according to the present invention is described in detail below with reference to the related drawings.

Figure 1:
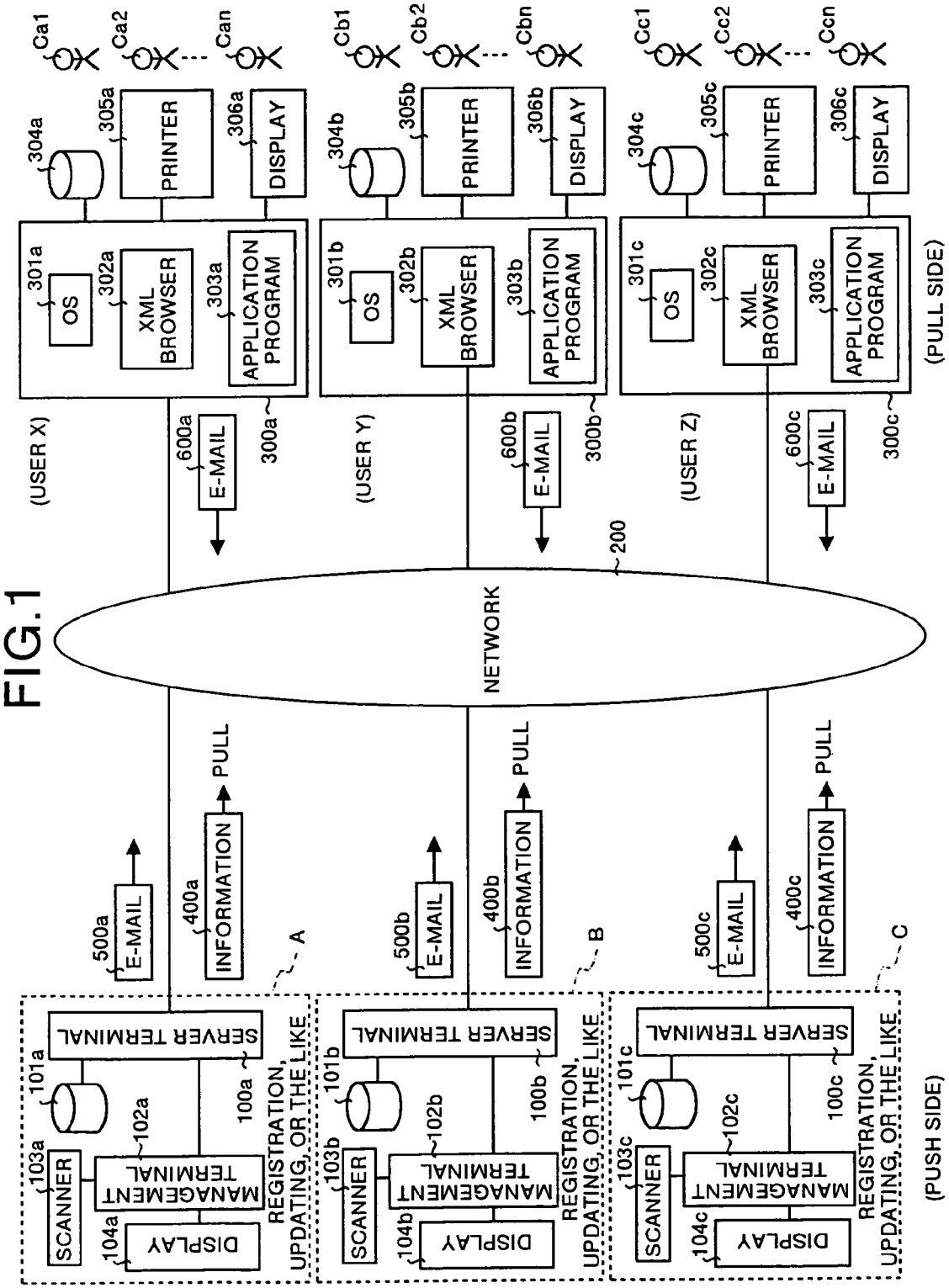
FIG. 1 is a block diagram showing configuration of one embodiment of the present invention.

FIG. 1 is a block diagram showing configuration of the integrated document management system according to one embodiment of the present invention. The integrated document management system shown in this figure is a system in which a plurality of documents required by a user can integratedly be retrieved by using a Hypertext described with the XML (eXtensible Markup Language) to link a plurality of digitized documents (drawings) to each other.

The XML is an extended version of functions of the HTML (Hypertext Markup Language) widely used as a means for exchanging information on the WWW (World Wide Web) and is based on standards provided from the World Wide Web Consortium (W3C). The XML has the features not available in the HTML such as the possibilities of defining a tag or expressing meaning of data with a tag at the user side.

The integrated document management system shown in FIG. 1 generally comprises server terminals 100a, 100b, and 100c each connected to a network 200 (for instance, the Internet), and clients 300a, 300b, and 300c connected also to the network 200. The server terminals 100a, 100b, and 100c are installed at Company A, Company B, and Company C (in the PUSH side) respectively and have storage units 101a, 101b, and 101c respectively.

The storage units 101a, 101b, and 101c store therein a document database which comprises a plurality of electronic documents (drawings) forming a hierarchical structure, a management information database which comprises a plurality of management information described with the XML. The document database and management information database will be described in detail later.

Each of the server terminals 100a, 100b, and 100c works as a Web server, and can distribute documents to the clients 300a, 300b, and 300c provided in the PULL side (at users X, Y, and Z) via the network 200. Management terminals 102a, 102b, and 102c are the computer terminals for providing management jobs for the server terminals 100a, 100b, and 100c. Further, the server terminals 100a, 100b, and 100c also work as E-mail servers, and can send E-mails 500a, 500b, and 500c to the clients 300a, 300b, and 300c or receive E-mails 600a, 600b, and 600c from the clients 300a, 300, and 300c respectively.

The management jobs include registration of a user, registration of a document, updating of a document, abortion of a drawing, acknowledgment, pertinence determination, or management of distribution. In registration of a user, such information as a password of a system user or the like is registered. System users in the PUSH side include managers and persons responsible for preparation of documents (drawings) in Companies A, B, and C. The PUSH side is defined herein as a side which sends the documents (drawings) as described above to the clients 300a, 300b, and 300c via the network 200.

On the other hand, system users in a PULL side include operators $C_{a1}$ to $C_{an}$ at the user X, operators $C_{b1}$ to $C_{bn}$ at the user Y, and operators $C_{c1}$ to $C_{cn}$ at the user Z. The PULL side is defined herein as a side which retrieves a desired document from the document database via the network 200. The integrated document management system described below has the feature that a desired document is retrieved in the PULL side.

Scanners 103a, 103b, and 103c are devices connected to the management terminals 102a, 102b, and 102c respectively each of which generates an electronic document by optically reading a paper document (e.g., a draft drawing). Displays 104a, 104b, and 104c are connected to the management terminals 102a, 102b, and 102c respectively, and display thereon various types of entry menu for user registration, abortion of a drawing, acknowledgment, pertinence determination, or management of distribution.

When registering the document the processing for registering of electronic documents (drawings) in each document database of the storage units 101a, 101b, and 101c respectively is carried out using the scanners 103a, 103b, and 103c. Further, in the document registration, each management information corresponding to the documents (drawings) is registered in each management information database of the storage units 101a, 101b, and 101c respectively.

Figure 2:
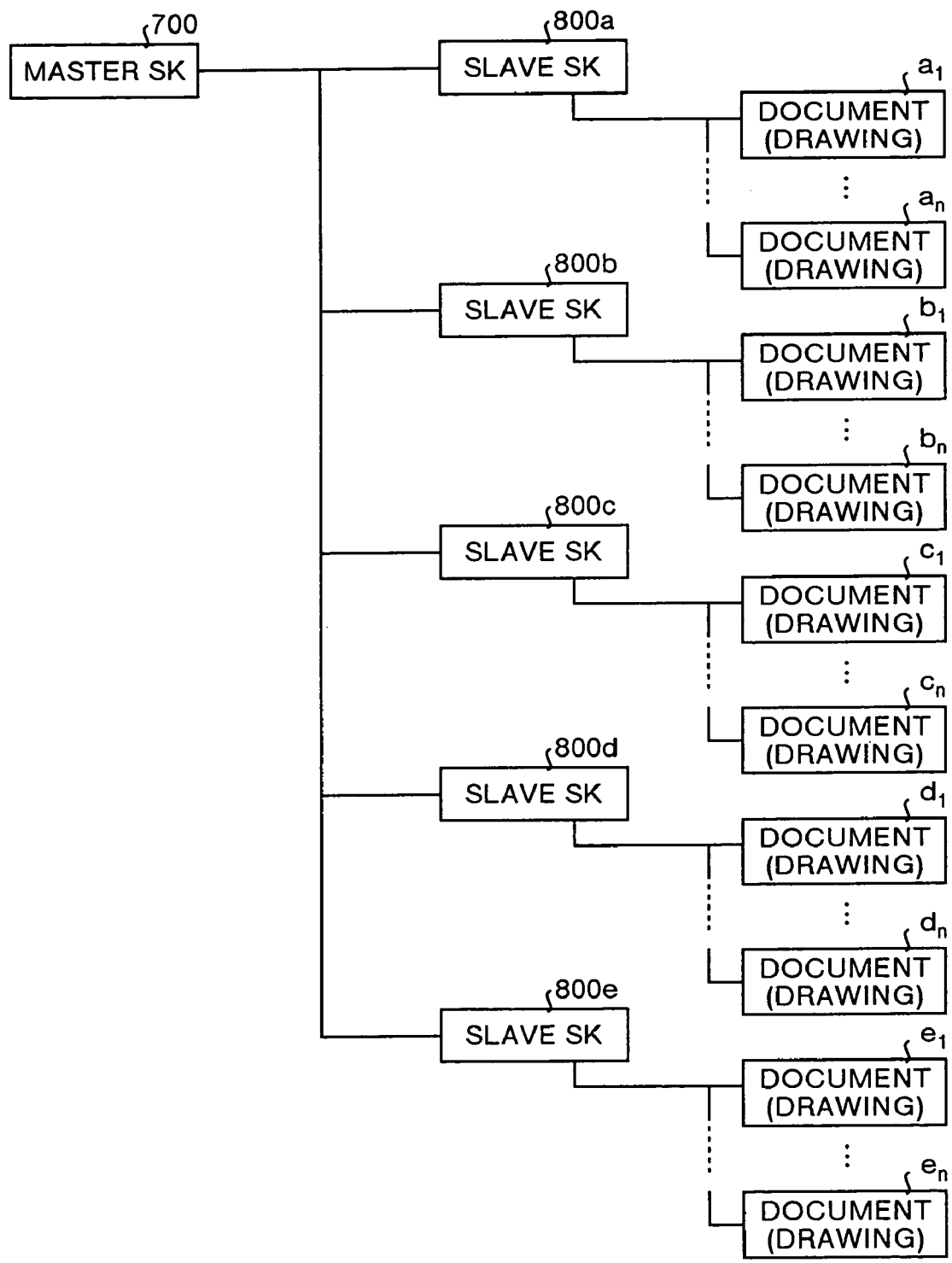
FIG. 2 is a view showing a relation between a master SK and a slave SK in this embodiment.

Registered contents in the document registration is described below with reference to the conceptual view shown in FIG. 2. FIG. 2 is a view showing a relation between a master SK (component list) and a slave SK. In the description below, a draft drawing will be taken as an example of a registered document. There exist many types of draft drawing for one device such as a "device master drawing", a "printed board/device packing structure diagram", an "analog circuit diagram", a "printed board packing diagram", a "component diagram", and a "logic circuit diagram". The "device master drawing" is a drawing showing entire configuration of the device, and is positioned as a document (drawing) in the upper layer.

On the other hand, the other drawings of the "printed board/device packing structure diagram", "analog circuit diagram", "printed board packing diagram", "component diagram", and "logic circuit diagram" each are subordinate to the "device master drawing" as the master drawing described above, and are positioned each as a document (drawing) in the lower layer respectively.

In FIG. 2, the master SK 700 corresponds to the "device master drawing" as the above-described master drawing, and the slave SKs 800a to 800e each of which is subordinate to the master SK 700 correspond to the "printed board/device packing structure view", "analog circuit diagram", "printed board packing diagram", "component diagram", and "logic circuit diagram" each as a slave drawing respectively. The slave SK 800a ("printed board/device packing structure diagram") consists of n-page documents $a_1$ to $a_n$. The slave SK 800b ("analog circuit diagram") consists of n-page documents $b_1$ to $b_n$, and the slave SK 800c ("printed board packing diagram") consists of n-page documents $c_1$ to $c_n$.

Figure 10:
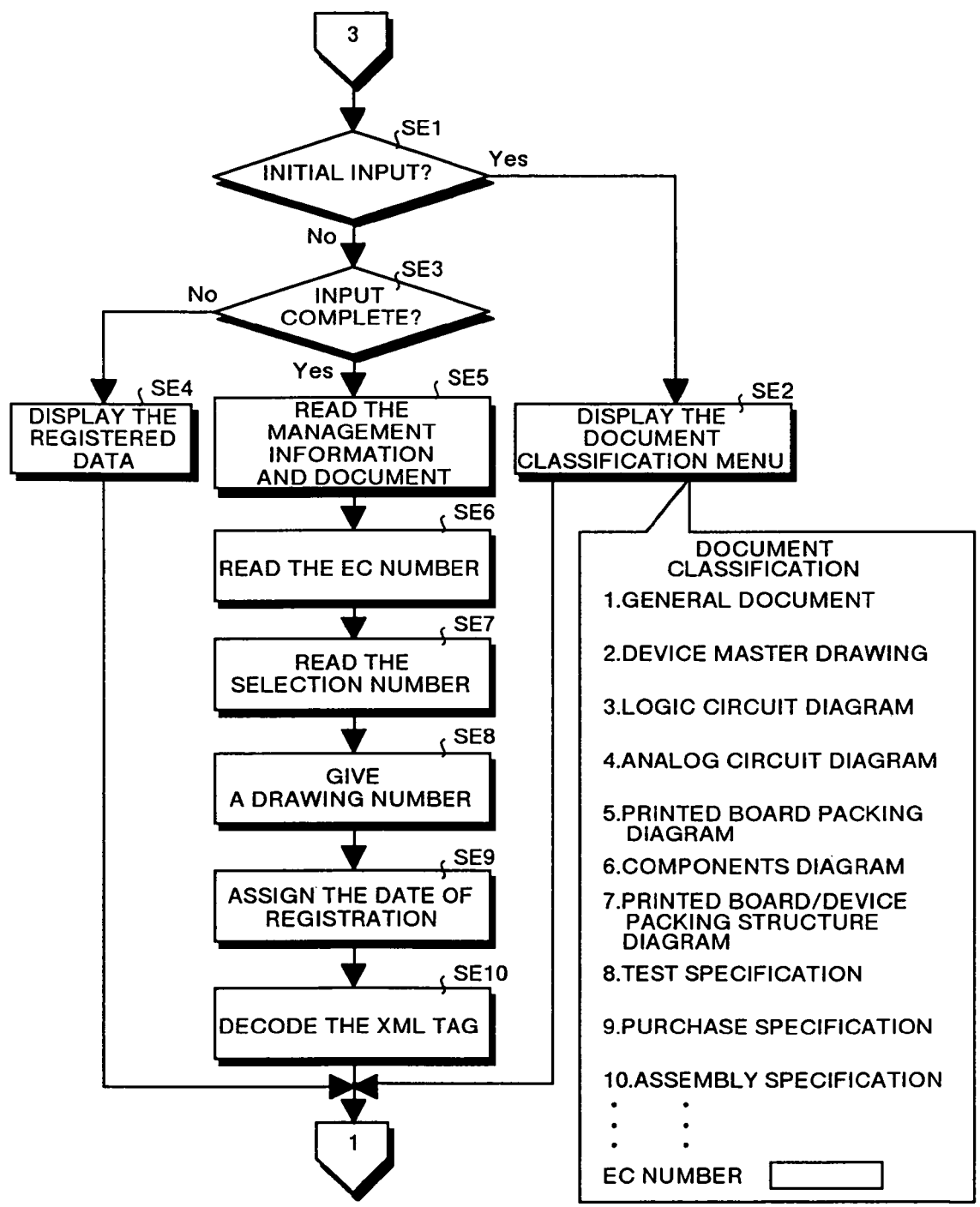
FIG. 10 is a flow chart showing the processing for document registration in this embodiment.

Further, the slave SK 800d ("component diagram") consists of n-page documents $d_1$ to $d_n$, and the slave SK 800e ("printed board/device packing structure diagram") consists of n-page documents $e_1$ to $e_n$. In addition, the "test specification", "purchase specification", and "assembly specification" or the like shown in FIG. 10 are also subordinate to the master SK 700 ("device master drawing"). As described above, in the document registration, the documents are stored in each of the storage units 101a, 101b, and 101c so that the master drawing and a plurality of slave drawings each of which is subordinate thereto form a hierarchical structure. The hierarchical structure is defined by a Hypertext based on the above-described XML.

Figure 3:
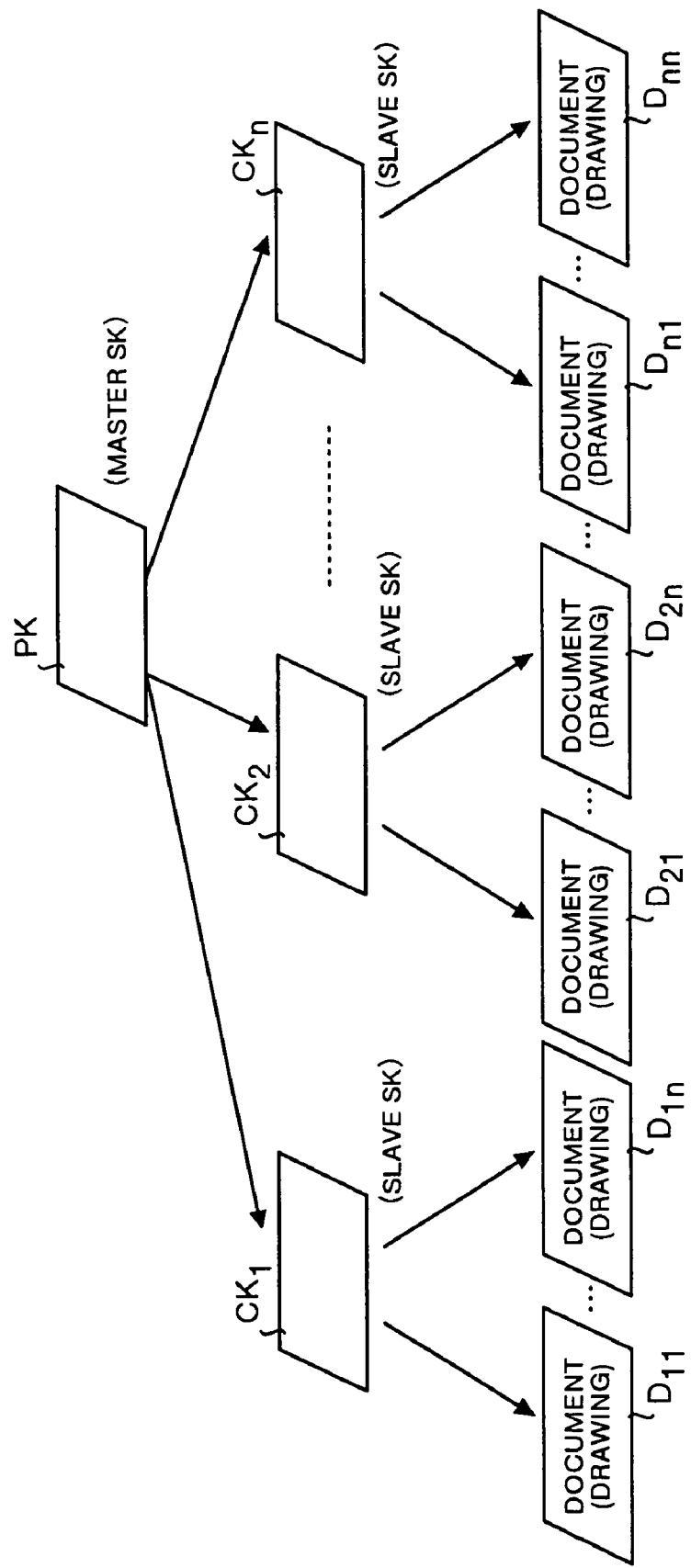
FIG. 3 is a view showing a hierarchical structure in this embodiment.

The hierarchical structure is described below with reference to FIG. 3. The hierarchical structure shown in FIG. 2 corresponds to management information PK as a master SK shown in FIG. 3 (Refer to FIG. 2), management information $CK_1$ to $CK_n$ each as the slave SK (Refer to FIG. 2) which is subordinate to the management information PK, and to documents such as (documents $D_{11}$ to $D_{1n}$), (documents $D_{21}$ to $D_{2n}$), . . . , (documents $D_{n1}$ to $D_{nn}$) each linking to the management information $CK_1$ to $CK_n$ respectively. The management information PK and the management information $CK_1$ to $CK_n$ indicate a collection of three files such as an XML file, a DTD file, and a DSL file, each of which includes information required for browsing a document in XML browsers 302a, 302b, and 302c described later.

The management information is described in detail below with reference to FIG. 4 and FIG. 5. The management information shown in FIG. 4 corresponds to the management information PK and the management information $CK_1$ to $CK_n$ shown in FIG. 3 respectively, and consists of an XML file $F_{XML}$ (Refer to FIG. 5), a DTD file $F_{DTD}$, and a DSL file $F_{DSL}$. The XML file $F_{XML}$ (File name: CA41205-2449.xml) is a file in which a plurality of elements each consisting of a starting tag <element name>, an end tag </element name>, and contents sandwiched between the starting tag and the end tag exist. For example, in the case of <design department code> 14321 </design department code>, an element name is <designing department code>, and the contents of the element is "14321".

In the XML file $F_{XML}$, <drawing number> is a tag corresponding to the drawing number of the corresponding drawing (e.g., the above-described "printed board/device packing structure diagram"). More specifically, the contents of <drawing number> is "CA41205-2449", which is used for identifying the "printed board/device packing structure view". <ECO/NRN> is a tag indicating whether the printed board/device packing structure view is the first version or updated version. More specifically, the contents of <ECO/NRN> is "F2224Z2411", which is called an EC (Engineering Control) number. In the EC number "F2224Z2411", in the case of its first version, "A" is inserted in between "F2224" and "12422", but, in the case of its updated version, "Z" is inserted therebetween in place of the "A". Therefore, the EC number is used for determining whether the corresponding drawing is the first version or updated version.

<drawing> is a tag corresponding to a file name of three documents forming the printed board/device packing structure view, and more specifically, the contents of the <drawing> are "CA41205-2449-01.ps (PostScript)", "CA41205-2449-02.ps", and "CA41205-2449-03.ps". These three documents are registered to the document database in, for instance, the storage unit 101a shown in FIG. 1 respectively.

Figure 4:
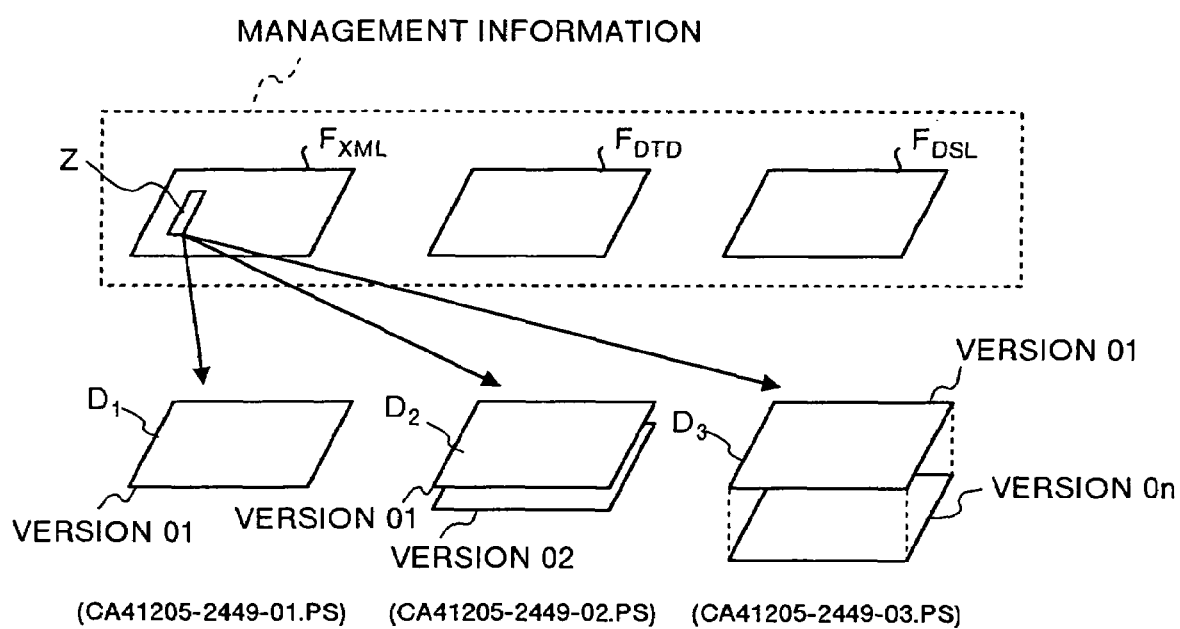
FIG. 4 is a view showing management information in this embodiment.

These three tags of <drawing> correspond to the tag Z shown in FIG. 4. Namely, a document $D_1$ ("CA41205-2449-01.ps"), a document $D_2$ "CA41205-2449-02.ps", and a document $D_3$ "CA41205-2449-03.ps" are defined as three documents forming the printed board/device packing structure view based on the three tags of <drawing>. <destination for presentation> is a tag which specifies a destination for submission of the printed board/device packing structure diagram. More specifically, the contents of <destination for presentation> is "Company XXYYZZ". <destination for distribution> is a tag which specifies destinations (e.g., the users X, Y, and Z shown in FIG. 1) for distribution of the documents $D_1$, $D_2$, and $D_3$. More specifically, the contents of <destination for presentation> are "Only the design department", "Company A", "Company B", and "Company C".

In FIG. 4, the DTD (Document Type Definition) file $F_{DTD}$ is a file which defines a tag in the XML file $F_{XML}$. Described in the DTD file $F_{DTD}$ are version number information (version 01) for the document file $D_1$, version number information (version 02) for the document file $D_2$, and version number information (version 03) for the document file $D_3$.

The DSL (Document Style Sheet) file $F_{DSL}$ is a file which defines a document style when documents are displayed on displays 306a, 306b, and 306c by using the XML browsers 302a, 302b, and 302c shown in FIG. 1. More specifically, font sizes of characters to be displayed and types of characters are defined in the file. Information concerning a link of management information $CK_1$ to $CK_n$ is defined in the management information PK shown in FIG. 3.

Returning to FIG. 1, the client 300a shall be the user X, and retrieves, through execution of an XML browser 302a and an application program 303a, management information and documents as information 400a, 400b, and 400c from each management information database and document database in the storage units 101a, 101b, and 101c respectively. The client 300a is operated by the operators $C_{a1}$ to $C_{an}$.

The XML browser 302a is a software program for displaying a document on the display 306a according to the management information based on the XML. The application program 303a is a program for executing the processing for retrieving information 400a, 400b, and 400c from the server terminals 100a, 100b, and 100c. An OS (Operating System) 301a is a program for controlling execution of the XML browser 302a and the application program 303a. A storage unit 304a stores therein documents and various types of data. A printer 305a copies (hard copy) a retrieved document.

The client 300b has the same functions as those in the client 300a, and is operated by the operators $C_{b1}$ to $C_{bn}$. The client 300b retrieves information 400a, 400b, and 400c through execution of an operating system 301b, an XML browser 302b, and an application program 303b. The client 300b has a storage unit 304b, a printer 305b, and a display 306b connected thereto.

The client 300c has the same functions as those in the client 300a, and is operated by the operators $C_{c1}$ to $C_{cn}$. The client 300c retrieves information 400a, 400b, and 400c through execution of an operating system 301c, an XML browser 302c, and an application program 303c. The client 300c has a storage unit 304c, a printer 305c, and a display 306c connected thereto. The clients 300a, 300b, and 300c have E-mail sending/receiving functions. They can send E-mails 600a, 600b, and 600c or receive E-mails 500a, 500b, and 500c respectively.

General Processing:—

The general processing of the integrated document management system according to this embodiment is described below with reference to the flow charts shown in FIG. 6 and FIG. 7. FIG. 7 is a view showing one example of XML browser-screen used for selecting a desired menu from various menu such as the user registration and document registration each described below and for displaying the selected menu thereon. In this figure, the "-MENU-" list includes menu options such as user registration, document registration, updating, acknowledgement, pertinence determination, distribution, reception, and copy each described later displayed thereon, from which the user selects one menu to make the system execute the desired processing. FIG. 7 shows an example of displaying a user registration menu when the user registration has been selected. The XML browser screen is a screen displayed on the displays 306a to 306c shown in FIG. 1 (or the displays 104a, 104b, and 104c) by starting the XML browsers 302a, 302b, and 302c.

Figure 8:
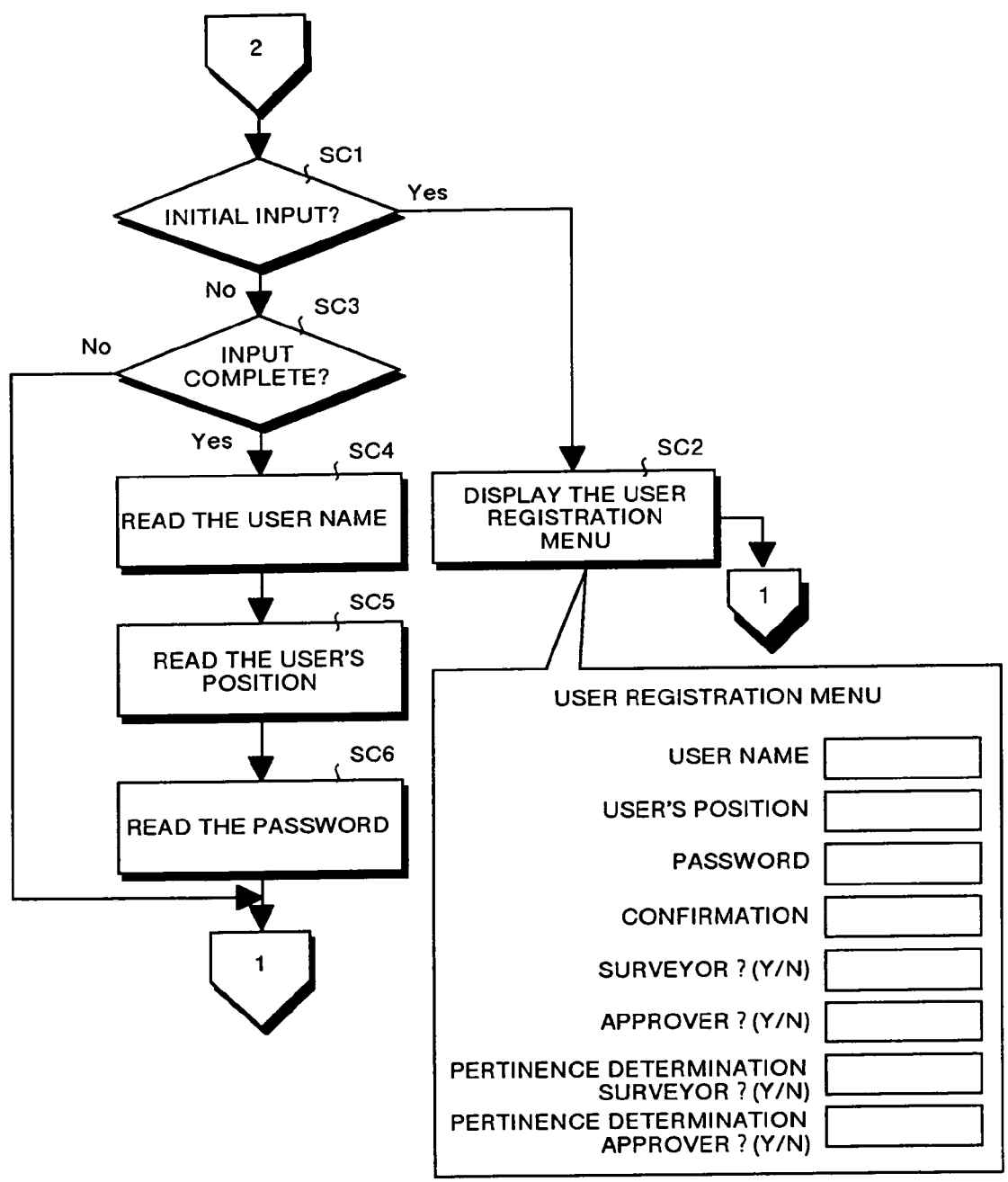
FIG. 8 is a flow chart showing the processing for user registration in this embodiment.

In the explanation below, operations when the client 300a shown in FIG. 1 retrieves a desired document from the server terminal 100a are mainly described. As shown in FIG. 6, the integrated document management system monitors each event (user registration, document registration, . . . , copy) from step SB1 to step SB9. In step SB1, it is determined whether the event of user registration has occurred. When the result of determination is "Yes", processing for user registration consisting of steps SC1 to SC6 shown in FIG. 8 is executed. On the other hand, when the result of determination is "No", the processing in step SB2 is executed.

The processing for user registration is the processing for registering the user information concerning a user for the server terminal 100a in the user database of the storage unit 101a shown in FIG. 1. Similarly, each user information is registered in each of user databases of the storage units 101b and 101c respectively. Details of the processing for user registration will be described later. The user information includes the user's name, his position, a password, his class, or the like. The user's name is a name or a title of a corresponding user. The user's position is the name of the position at which he/she works or a company in which he/she works. The password is a code string used when the corresponding user is to access the integrated document management system and also used for identifying whether the user is an authorized user or not. The processing for user registration is executed through operation of the management terminals 102a, 102b, and 102c by each manager of the Company A, Company B, and Company C shown in FIG. 1.

In the next step SB2, it is determined whether the event of document registration has occurred. When the result of determination is "Yes", the processing of document registration consisting of step SE1 to step SE10 shown in FIG. 10 is executed. On the other hand, when the result of determination in step SB2 is "No", the processing in step SB3 is executed.

The document registration is the processing for registering an electronic document (drawing or the like) to be distributed to the users X, Y, and Z and the management information concerning the document in the document database and the management information database in the storage unit 101a. Details of the processing for document registration will be described later. A document and its management information are registered in each document database and management information database in the storage units 101b and 101c. The processing for document registration is executed through operation of the management terminals 102a, 102b, and 102c by the managers (or responsible persons in the design department) in the Company A, Company B, and Company C shown in FIG. 1.

Figure 12:
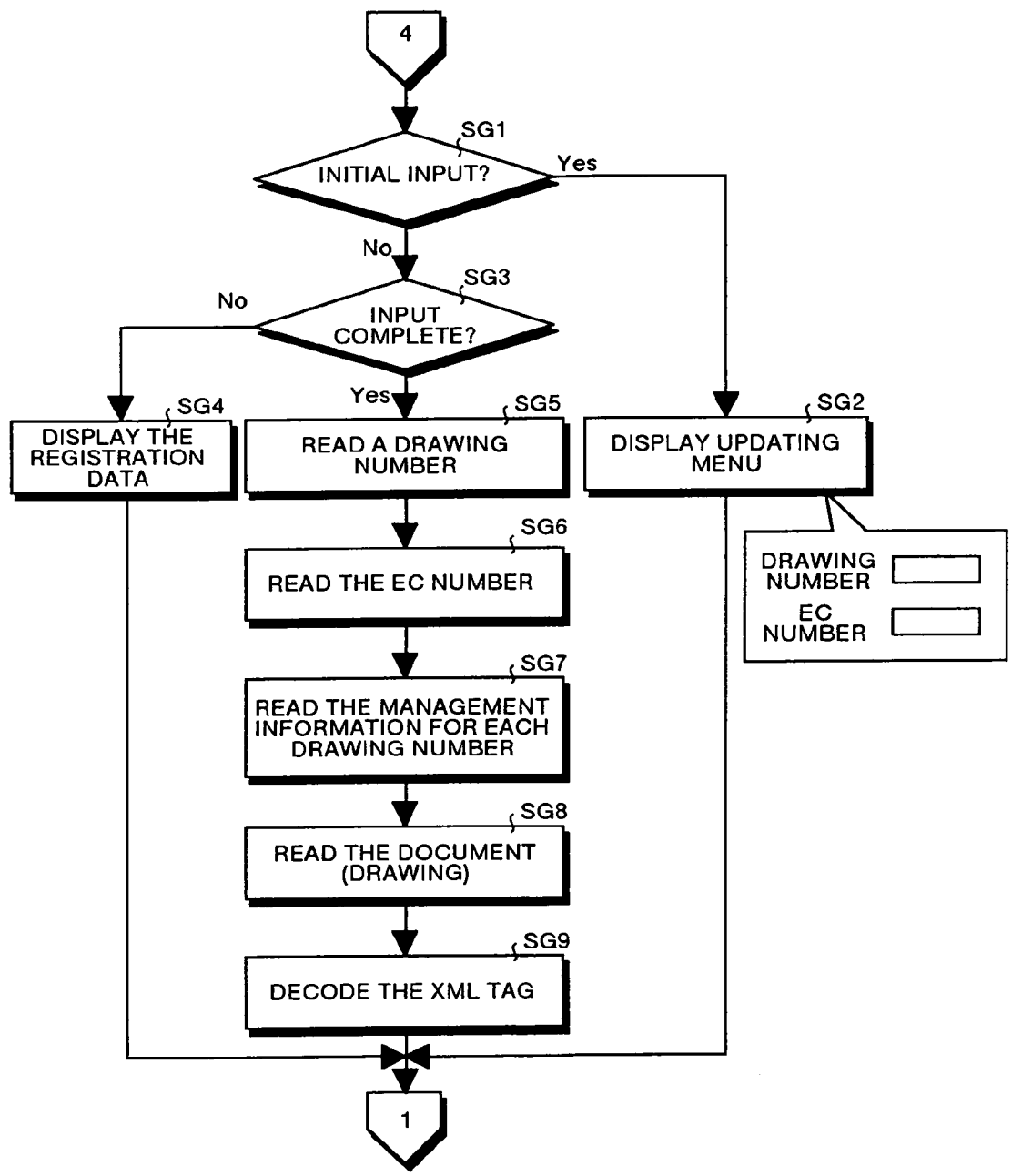
FIG. 12 is a flow chart showing the processing for updating in this embodiment.

In the next step SB3, it is determined whether the event of updating has occurred. When the result of determination is "Yes", processing for updating consisting of step SG1 to step SG9 shown in FIG. 12 is executed. On the other hand, when the result of determination in step SB3 is "No", the processing in step SB4 is controlled.

The processing for updating is the processing for registering, when the document registered in the document database of the storage unit 101a is updated, the updated electronic document in the document database as well as processing for updating management information of the corresponding document. Details of the processing for updating will be described later. This processing for updating is also executed to each document in the document database as well as to management information of the document in the storage units 101b and 101c. The processing for updating is executed through operation of the management terminals 102a, 102b, and 102c by the managers (or responsible persons in the design department) in the Company A, Company B, and Company C shown in FIG. 1.

Figure 14:
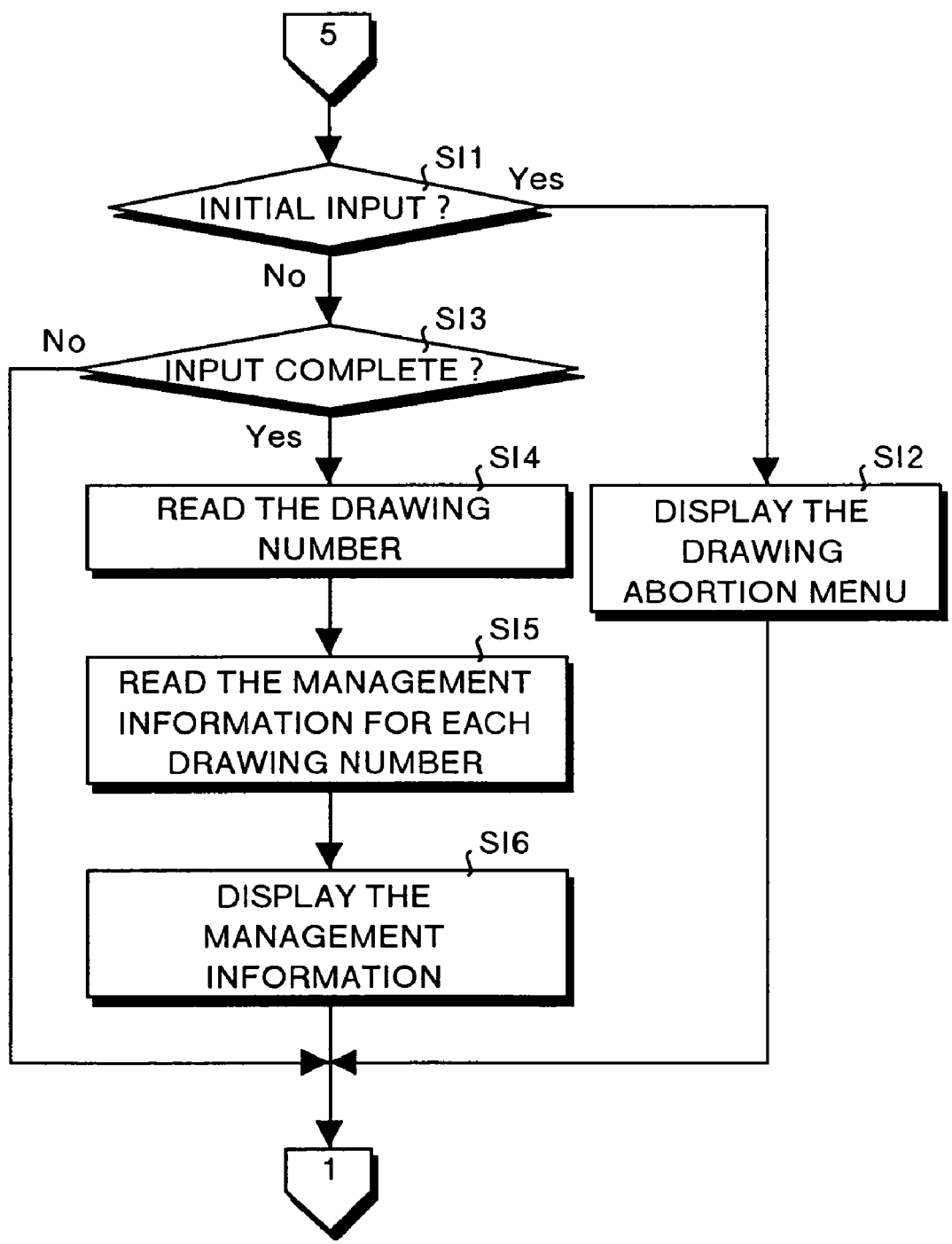
FIG. 14 is a flow chart showing the processing for abortion of a draft drawing in this embodiment.

In the next step SB4, it is determined whether the event of abortion has occurred. When the result of determination is "Yes", processing for aborting a document consisting of step SI1 to step SI6 shown in FIG. 14 is executed. On the other hand, when the result of determination in step SB4 is "No", the processing in step SB5 is executed.

The processing for aborting a document is processing for deleting a document (drawing) registered in the document database of the storage unit 101a. In the processing for aborting a document, processing for adding historic information concerning abortion of a document such as <Article> Abortion </Article> to management information on the deleted document. Details of the processing for aborting a document will be described later. This processing for aborting a document is also executed to each document database and management information in the storage units 101b and 101c. The processing for aborting a document is executed through operation of the management terminals 102a, 102b, and 102c by managers (or the responsible persons in the design department) in the Company A, Company B, and Company C shown in FIG. 1.

Figure 16:
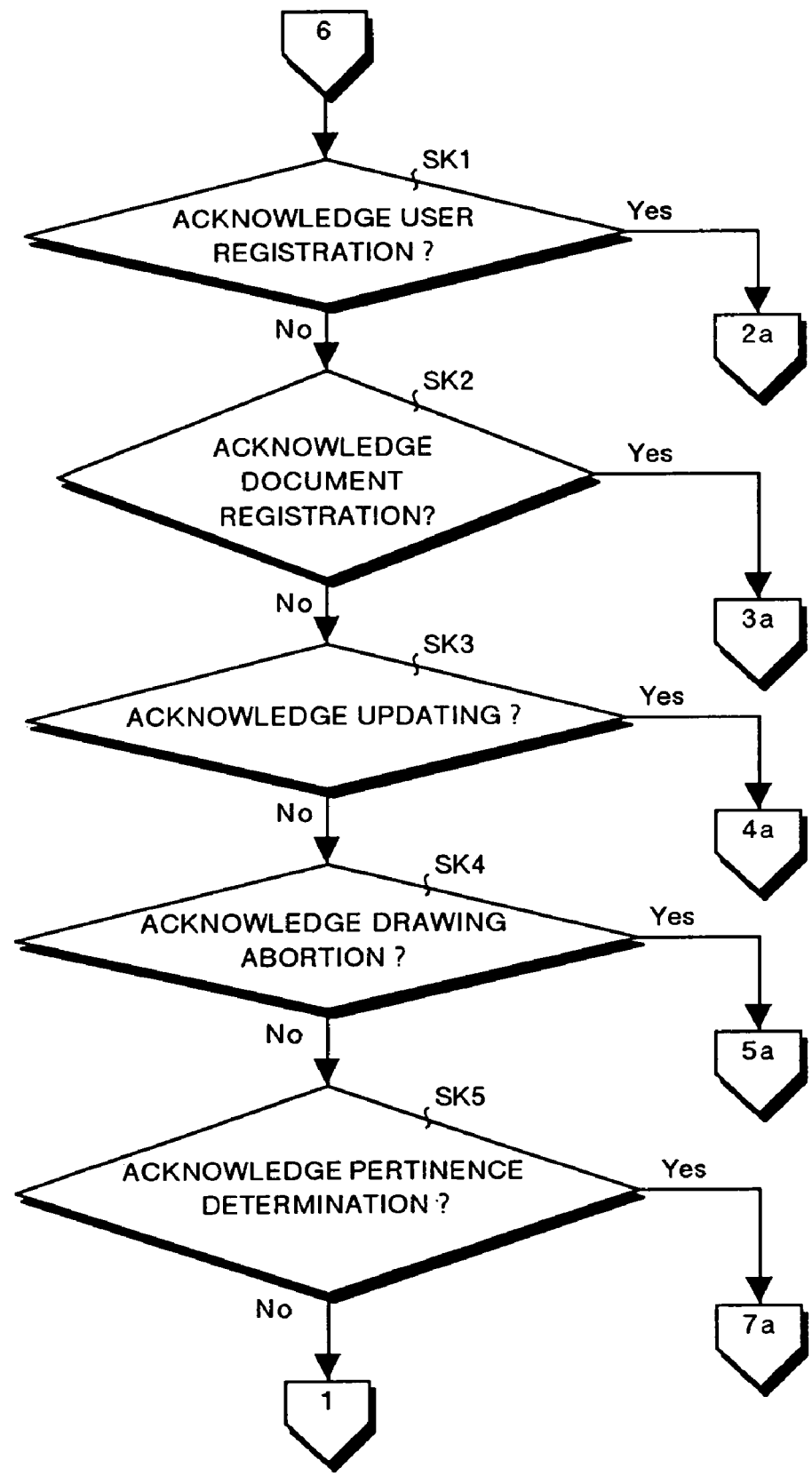
FIG. 16 is a flow chart showing the processing for acknowledgement in this embodiment.

In the next step SB5, it is determined whether the event of acknowledgement has occurred. When the result of determination is "Yes", the processing for acknowledgment consisting of step SK1 to step SK5 shown in FIG. 16 is executed. On the other hand, when the result of determination in step SB5 is "No", the processing in step SB6 is executed.

The processing for acknowledgment shown in FIG. 16 is processing executed after execution of each processing for user registration (Refer to FIG. 8), document registration (Refer to FIG. 10), updating (Refer to FIG. 12), aborting a document (Refer to FIG. 14), and pertinence determination which is described later (Refer to FIG. 17), and is processing for acknowledging the user registration, document registration, updating, abortion, and pertinence determination respectively.

Figure 9:
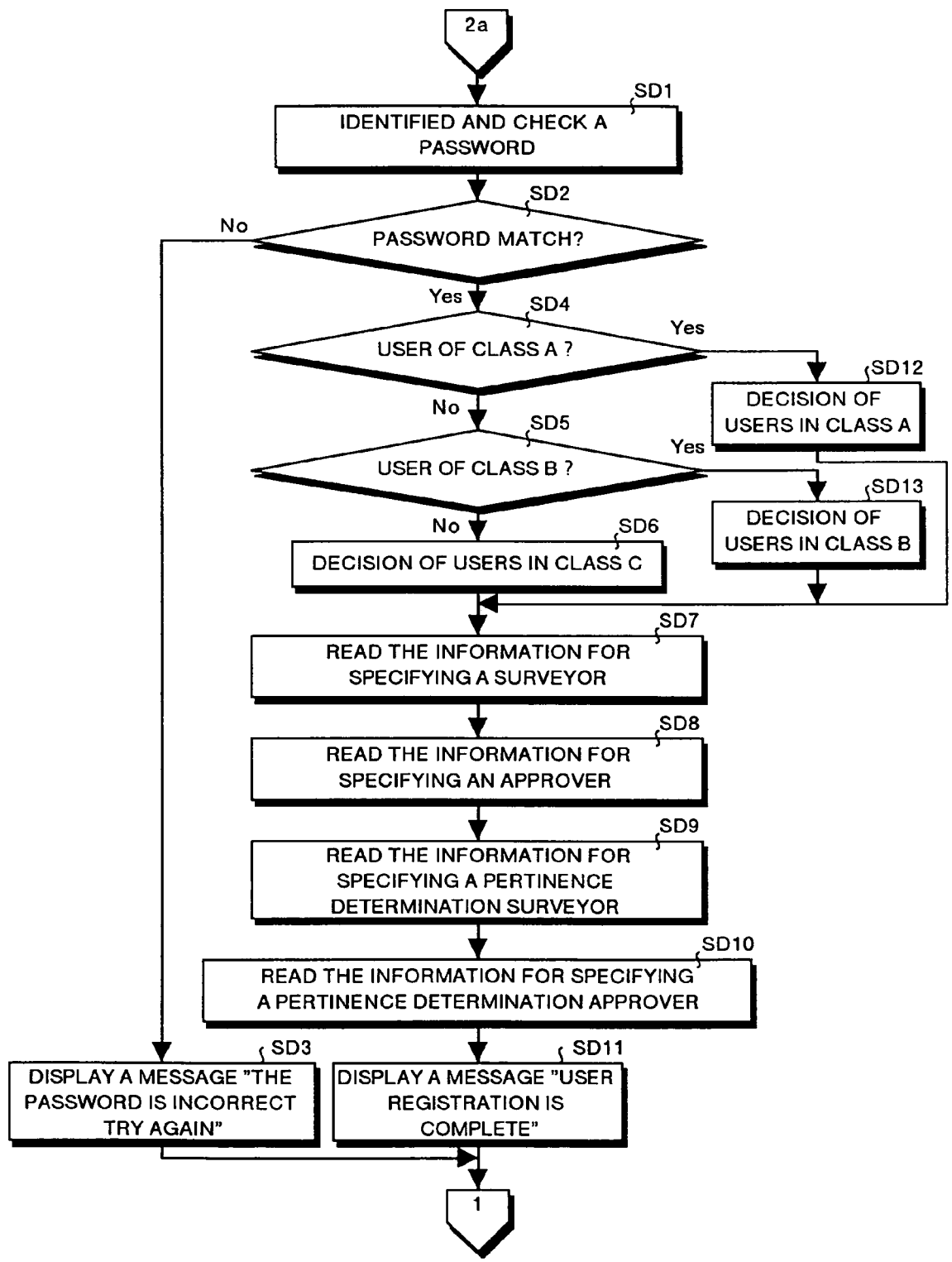
FIG. 9 is a flow chart showing the processing for acknowledgment of the user registration in this embodiment.

More specifically, after the processing for user registration (Refer to FIG. 8) is executed, in step SK1 shown in FIG. 16, it is determined whether the event of acknowledging user registration has occurred. When the result of determination is "Yes", acknowledgment processing for user registration consisting of step SD1 to step SD13 shown in FIG. 9 is executed. On the other hand, when the result of determination in step SK1 is "No", the processing in step SK2 is executed. The acknowledgment processing for user registration shown in FIG. 9 is processing for determining whether the user registration is acknowledged based on a password or the like inputted in the user registration processing (Refer to FIG. 8), and further is processing for determining a class of the acknowledged user (e.g., class A, class B, or class C). Details of the acknowledgment processing for user registration will be described later.

Figure 11:
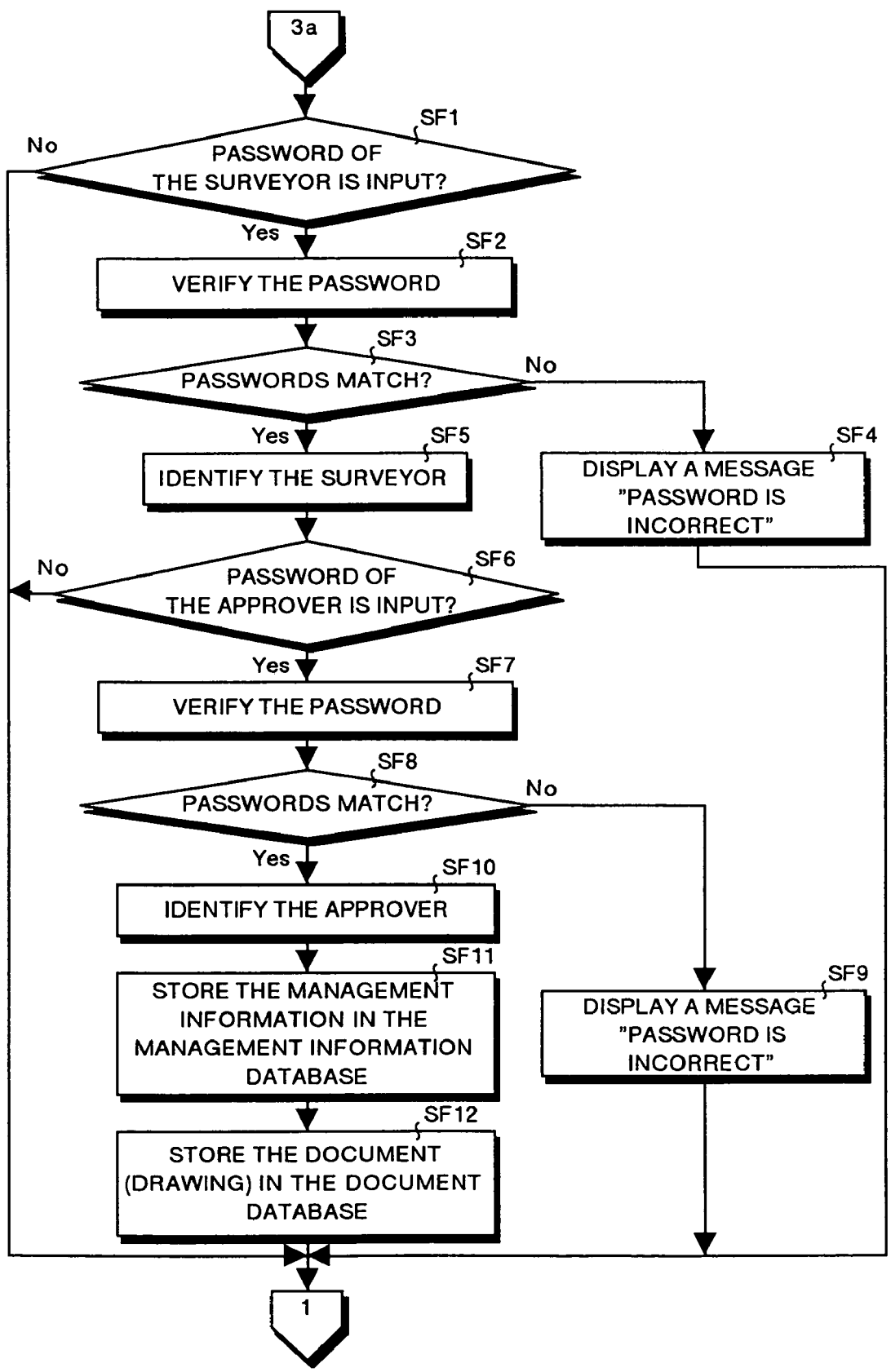
FIG. 11 is a flow chart showing the processing for acknowledgment of the document registration in this embodiment.

In the next step SK2, it is determined whether the event of acknowledging document registration has occurred. When the result of determination is "Yes", the acknowledgment processing for document registration consisting of step SF1 to step SF12 shown in FIG. 11 is executed. On the other hand, when the result of determination in step SK2 is "No", the processing in step SK3 is executed. The acknowledgment processing for document registration shown in FIG. 11 is processing for determining whether registration of the document inputted in the document registration processing (Refer to FIG. 10) is acknowledged. Details of the acknowledgment processing for document registration will be described later.

Figure 13:
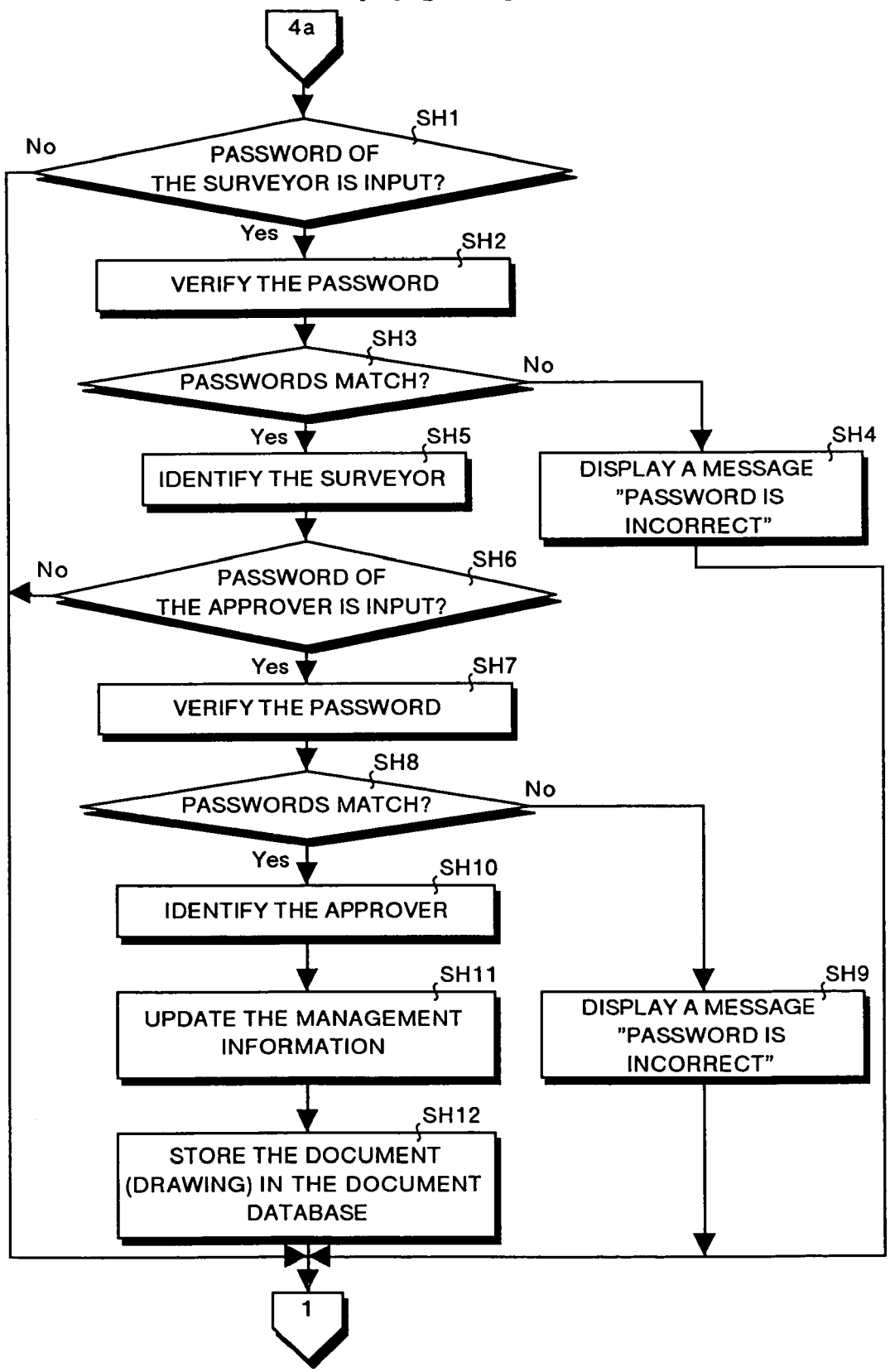
FIG. 13 is a flow chart showing the processing for acknowledgment of the updating in this embodiment.

In the next step SK3, it is determined whether the event of acknowledging updating a document has occurred. When the result of determination is "Yes", the acknowledgment processing for updating a document consisting of step SH1 to step SH12 shown in FIG. 13 is executed. On the other hand, when the result of determination in step SK3 is "No", the processing in step SK4 is executed. The acknowledgment processing for updating a document shown in FIG. 13 is processing for determining whether the document to be updated inputted in the updating processing (Refer to FIG. 12) is acknowledged. Details of the acknowledgment processing for updating a document will be described later.

Figure 15:
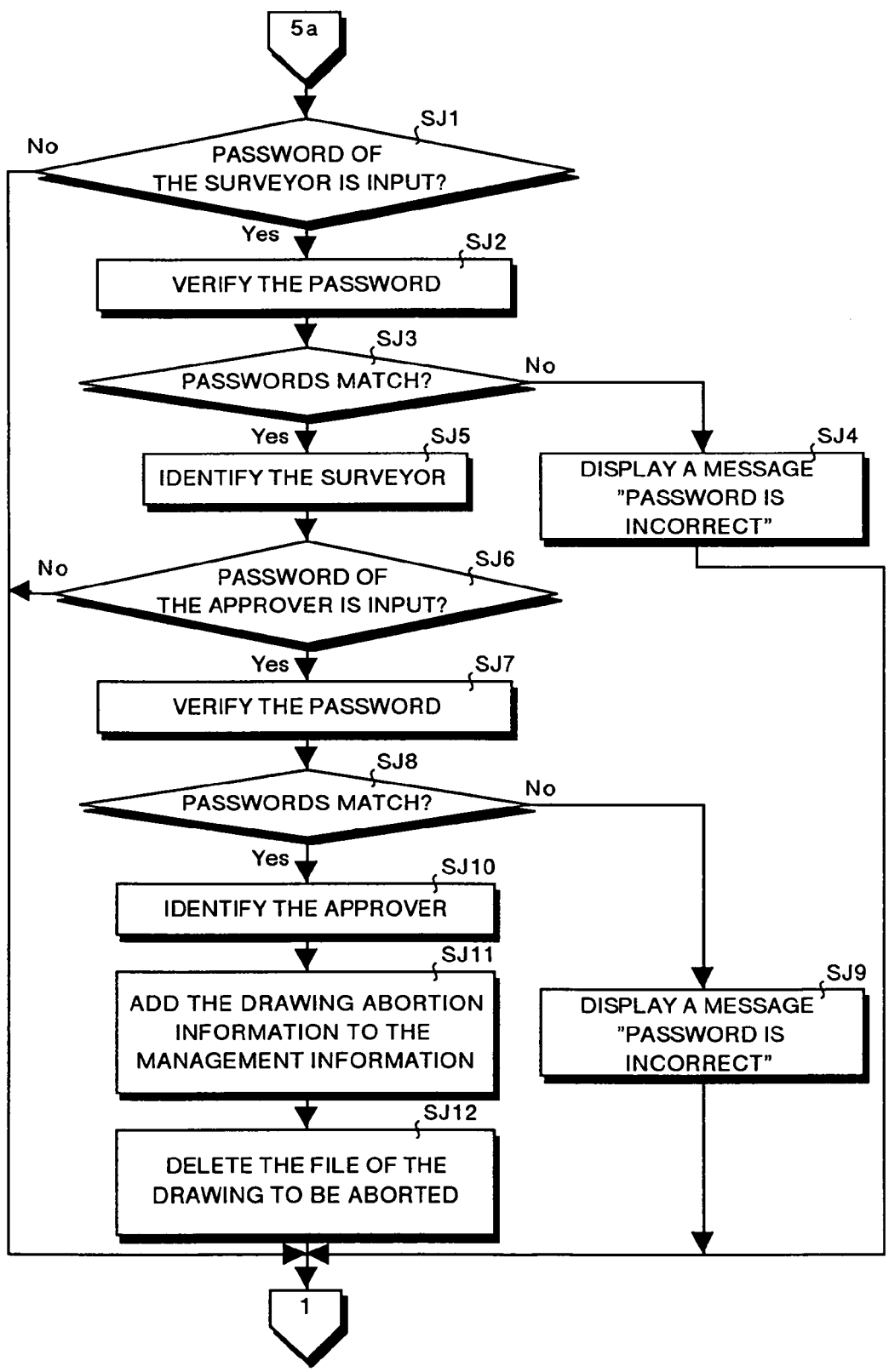
FIG. 15 is a flow chart showing the processing for acknowledgment of the abortion of a draft drawing in this embodiment.

In the next step SK4, it is determined whether the event of acknowledging aborting a document has occurred. When the result of determination is "Yes", the acknowledgment processing for aborting a document consisting of step SJ1 to step SJ12 shown in FIG. 15 is executed. On the other hand, when the result of determination in step SK4 is "No", the processing in step SK5 is executed. The acknowledgment processing for aborting a document shown in FIG. 15 is processing for determining whether abortion of the document specified in the abortion processing (Refer to FIG. 14) is acknowledged. Details of the acknowledgment processing for aborting a document will be described later.

Figure 17:
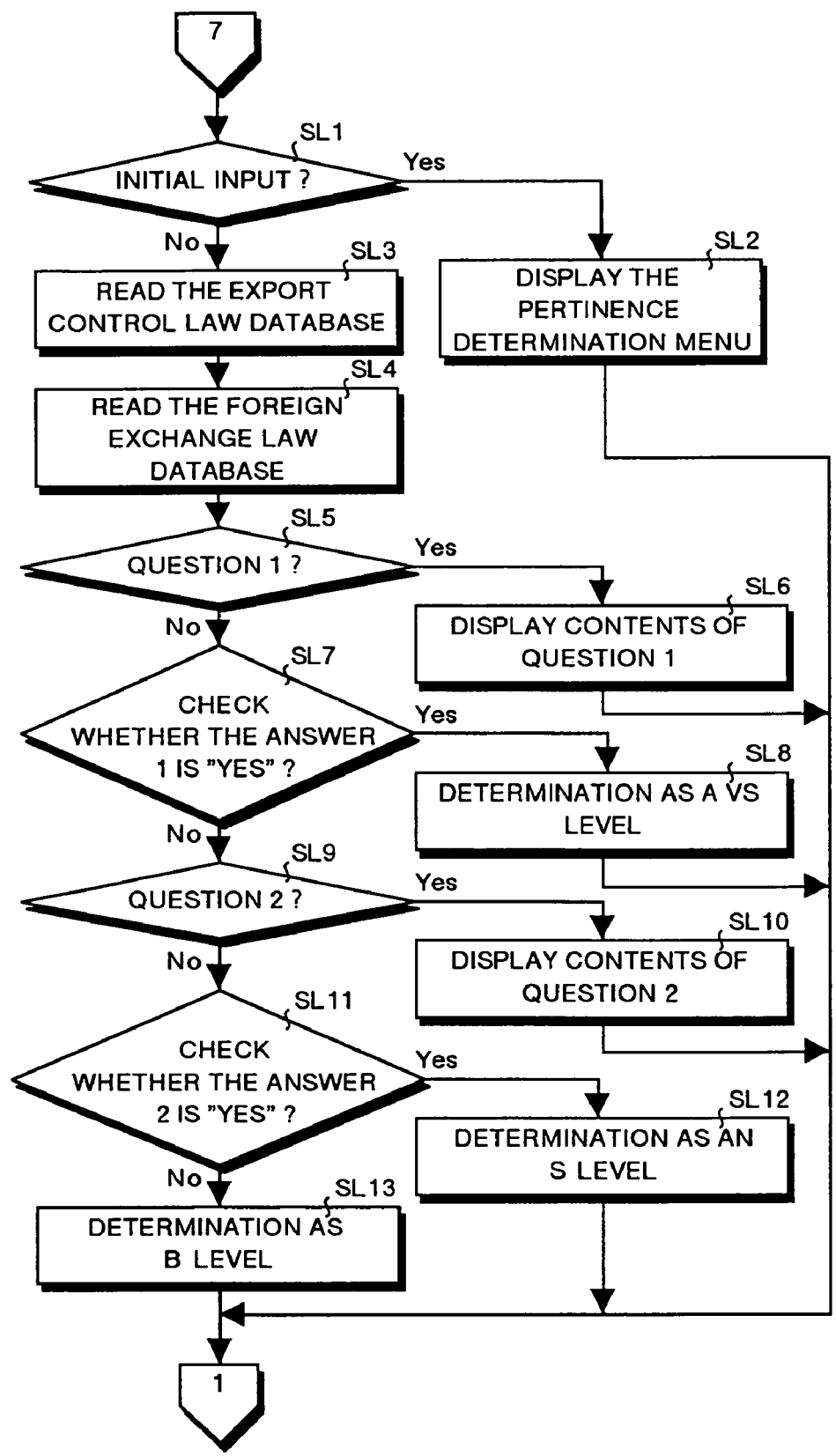
FIG. 17 is a flow chart showing the processing for pertinence determination in this embodiment.
Figure 18:
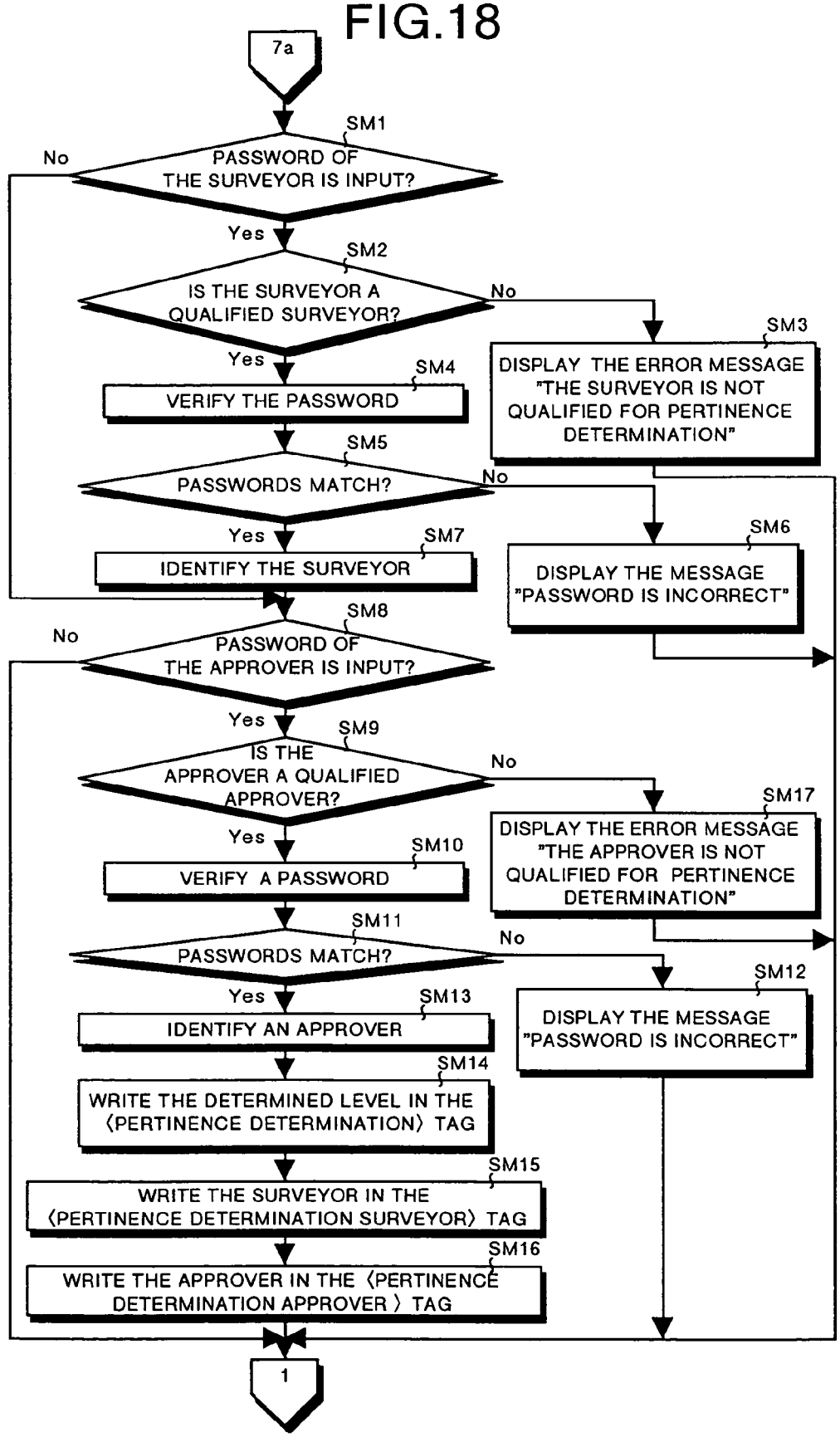
FIG. 18 is a flow chart showing the processing for acknowledgment of the pertinence determination in this embodiment.

In the next step SK5, it is determined whether the event of acknowledging pertinence determination has occurred. When the result of determination is "Yes", the acknowledgment processing for pertinence determination consisting of step SM1 to step SM17 shown in FIG. 18 is executed. On the other hand, when the result of determination in step SK5 is "No", the processing in the loop of the events shown in FIG. 6 is executed. The acknowledgment processing for pertinence determination shown in FIG. 18 is processing for determining whether pertinence determination in the pertinence determination processing (Refer to FIG. 17) which is described later is acknowledged. Details of the acknowledgment processing for pertinence determination will be described later.

In the next step SB6 (FIG. 6), it is determined whether the event of pertinence determination has occurred. When the result of determination is "Yes", the processing for pertinence determination consisting of step SL1 to step SL13 shown in FIG. 17 is executed. On the other hand, when the result of determination in step SB6 is "No", the processing in step SB7 is executed. The pertinence determination indicates determination, when a document is to be distributed abroad via the Internet or the like, as to whether distribution of the document is allowable under restrictions by the Export Control Law or Foreign Exchange Law. More specifically, in pertinence determination, it is determined to which level of three levels such as a VS (very sensitive) level, an S (sensitive) level, and a B (basic) level the document corresponds. Details of the processing for pertinence determination will be described later. The pertinence determination processing is also executed in the server terminals 100b and 100c.

Figure 19:
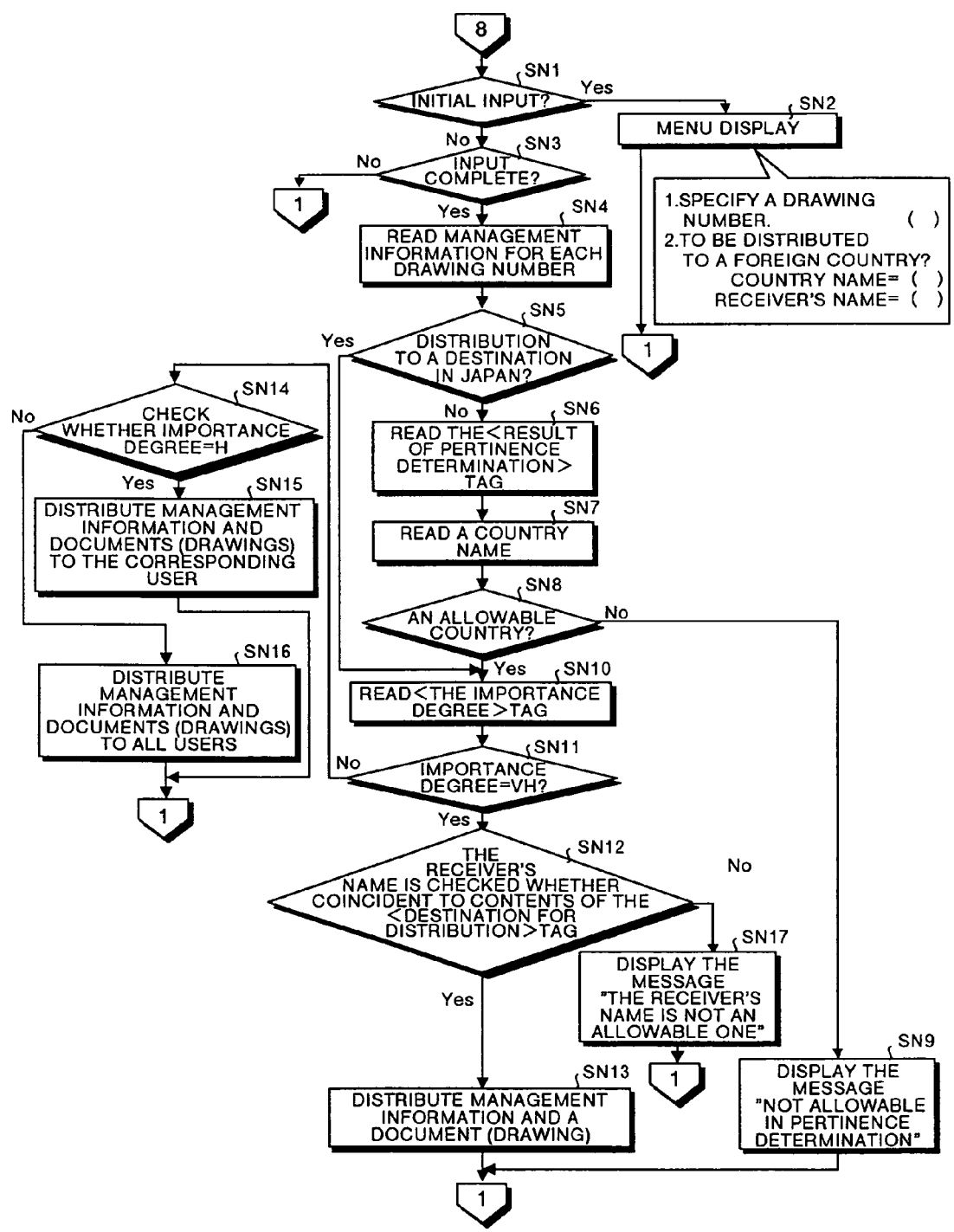
FIG. 19 is a flow chart showing the processing for distribution of a document in this embodiment.

In the next step SB7, it is determined whether the event of managing distribution has occurred. When the result of determination is "Yes", the processing for distribution consisting of step SN1 to step SN17 shown in FIG. 19 is executed. On the other hand, when the result of determination in step SB7 is "No", the processing in step SB8 is executed. Details of the processing for distribution will be described later. The distribution processing is also executed in the server terminals 100b and 100c.

Figure 20:
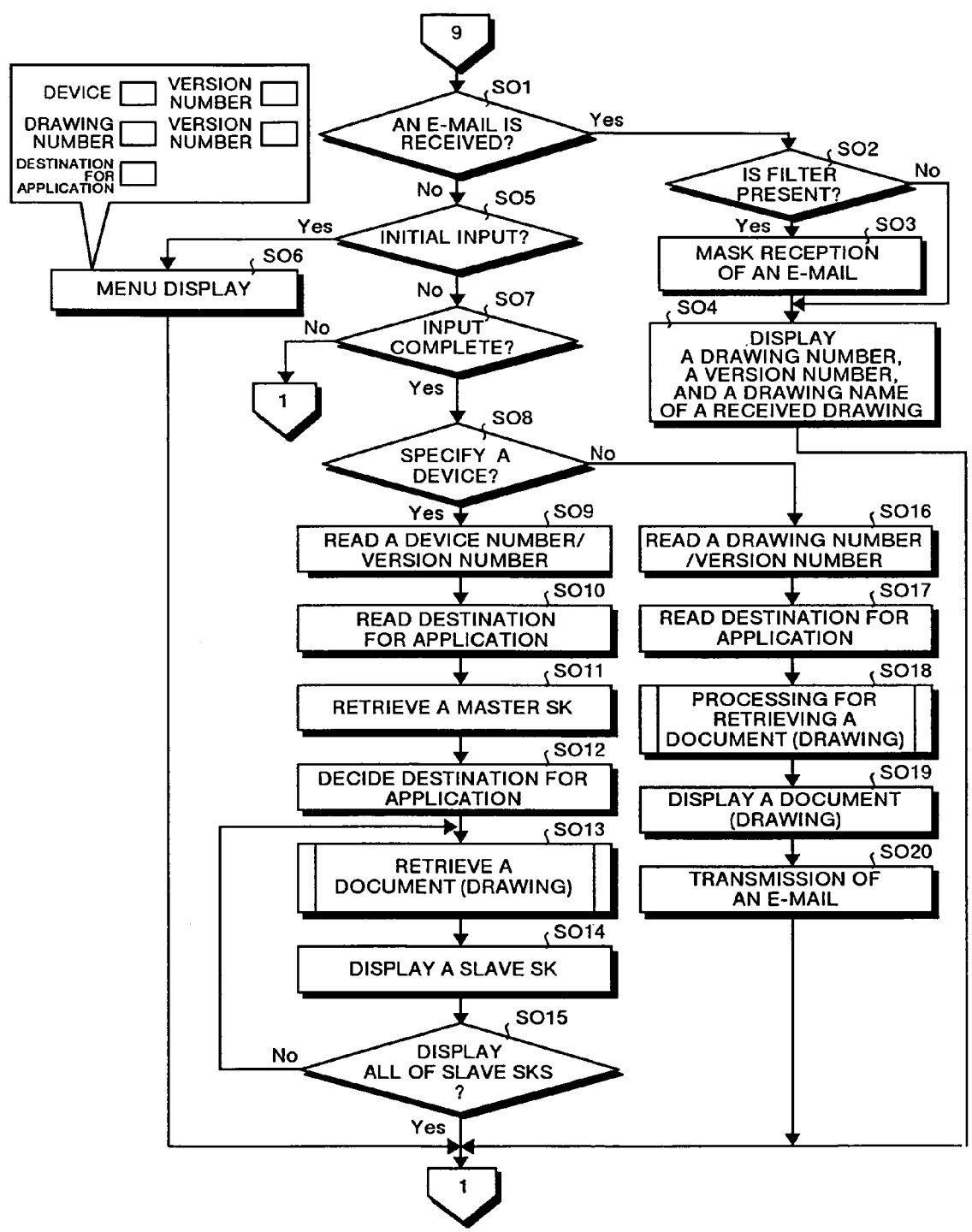
FIG. 20 is a flow chart showing the processing for reception of a document in this embodiment.

In the next step SB8, it is determined whether the event of managing reception has occurred. When the result of determination is "Yes", the processing for reception consisting of step SO1 to step SO20 shown in FIG. 20 is executed. On the other hand, when the result of determination in step SB8 is "No", the processing in step SB9 is executed. The processing for reception is processing that the client 300a receives documents (management information) from the server terminals 100a, 100b, and 100c. Details of the processing for reception will be described later. The reception processing is also executed in the clients 300b and 300c.

Figure 24:
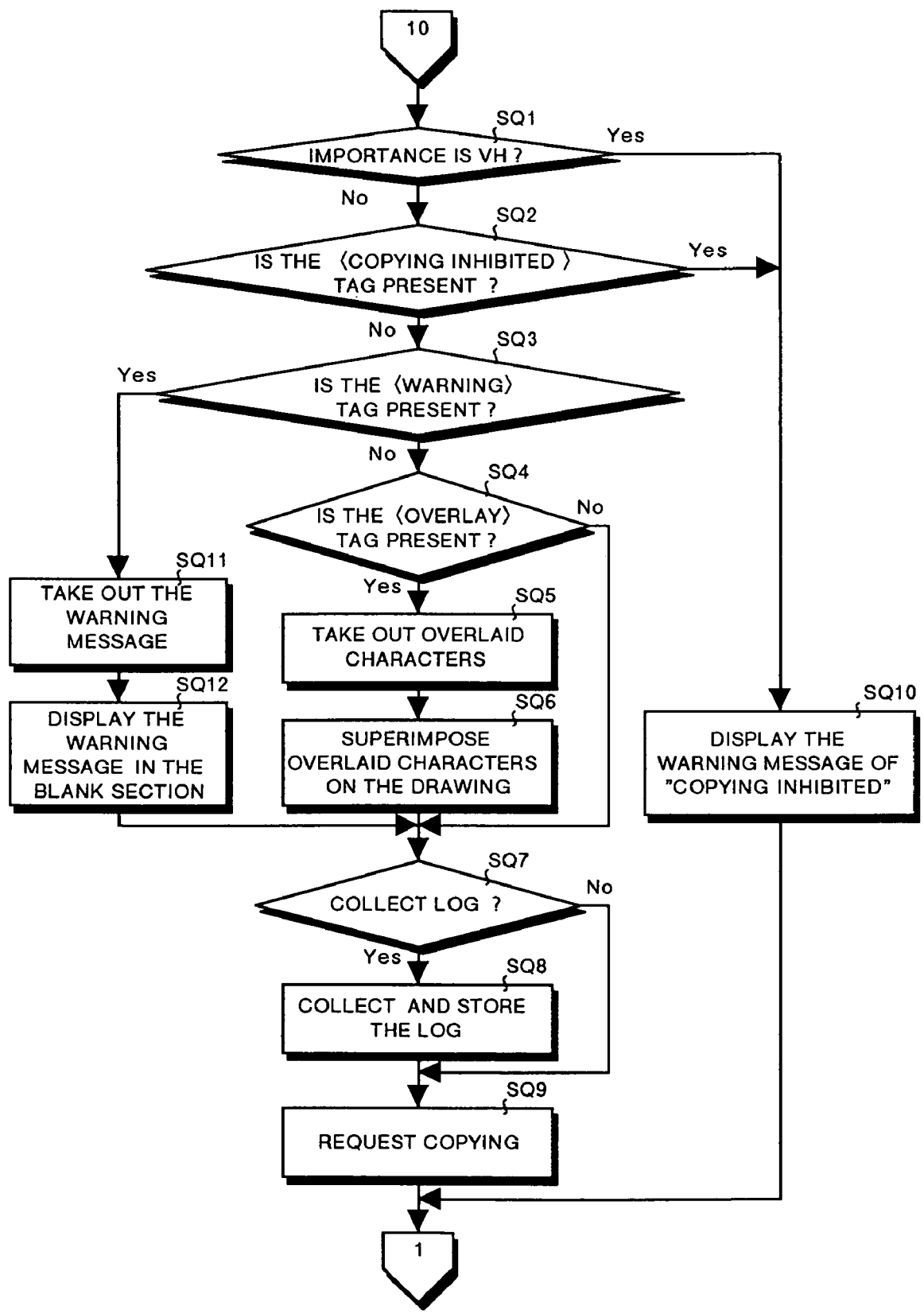
FIG. 24 is a flow chart showing the processing for copying in this embodiment.

In the next step SB9, it is determined whether the event of copy has occurred. When the result of determination is "Yes", the processing for copying consisting of step SQ1 to step SQ12 shown in FIG. 24 is executed. On the other hand, when the result of determination in step SB9 is "No", the processing in step SB1 is again executed. The processing for copying is processing for copying (hard copy), when the client 300a receives an electronic document, the document by a printer 305a. Details of the processing for copying will be described later. The copying processing is also executed in the clients 300b and 300c.

User Registration/Acknowledgment Processing:—

The processing for user registration and acknowledgment of the user registration is described below with reference to FIG. 6 to FIG. 9 and FIG. 16. First of all, a description of the processing for user registration is given with reference to FIG. 6 and FIG. 8. At first, a manager of the server terminal 100a shown in FIG. 1 carries out "User registration" by using the management terminal 102a in order to register user information in the user database of the storage unit 101a. Namely, when "user registration" is selected from the XML browser menu screen (Refer to FIG. 7), the event of user registration occurs, thus the result of determination in step SB1 shall be "Yes". Therefore, in step SC1 shown in FIG. 8, it is determined whether the input is an initial one. In this case, as the input is an initial one, the result of determination in step SC1 shall be "Yes".

Figure 6:
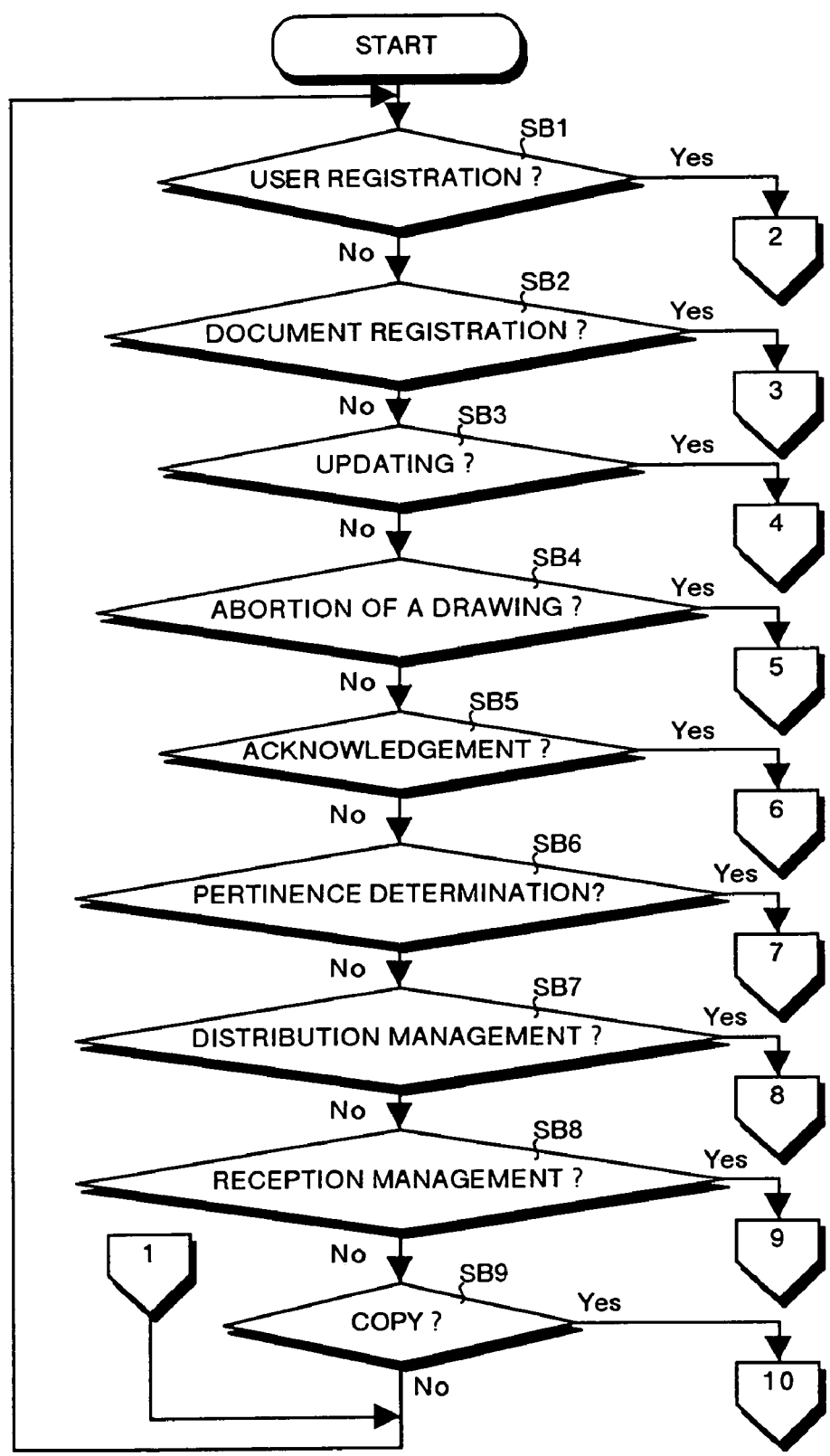
FIG. 6 is a flow chart showing general processing in the embodiment.

In step SC2, the user registration menu is displayed on the display 104a of the management terminal 102a, and then the processing in the loop of the events shown in FIG. 6 is executed. The user registration menu includes items of "user name", "user's position", "password" and "confirmation", "surveyor? (Y/N)", "approver? (Y/N)", "pertinence determination surveyor? (Y/N)", and "pertinence determination approver? (Y/N)". The manager inputs the user's name, a user's position, and a password, and then inputs the password again in the item of "Confirmation" in the last step.

Further, in the user registration menu, the manager inputs "Y" in any item of the items of "surveyor? (Y/N)", "approver? (Y/N)", "pertinence determination surveyor? (Y/N)", and "pertinence determination approver? (Y/N)" that applies for a user to be registered, and inputs "N" in any of the items that does not apply. The surveyor is a person who actually carries out various types of processing which are described later, and the approver is a person who has the authority to approve the various types of processing executed by the surveyor. The pertinence determination surveyor is a person who actually carries out pertinence determination which is described later, and the pertinence determination approver is a person who has the authority to approve the result of pertinence determination by the pertinence determination surveyor. In this case, as the event of user registration has occurred, the result of determination in step SB1 shown in FIG. 6 shall be "Yes", and further the result of determination in step SC1 shown in FIG. 8 shall be "No" because the input is not the initial one.

In step SC3, it is determined whether entry of items in the user registration menu is completed. When the result of determination is "No", the processing in the event loop shown in FIG. 6 is again executed. In this case, assuming that the entry is completed, the result of determination in step SC3 shall be "Yes". In step SC4, the user name inputted in "user name" of the user registration menu is read out. Similarly, in step SC5, the user's position inputted in "user's position" of the user registration menu is read out. In step SC6, the password inputted in "password" of the user registration menu is read out, and then the processing in the event loop shown in FIG. 6 is again executed.

When the manager selects "acknowledgment" on the XML browser menu screen (Refer to FIG. 7) by using the management terminal 102a, the event of acknowledgment occurs, thus the result of determination in step SB5 shown in FIG. 6 shall be "Yes". When "acknowledgment of user registration" is selected, the result of determination in step SK1 shown in FIG. 16 shall be "Yes". In step SD1 shown in FIG. 9, the password for confirmation inputted in "confirmation" of the user registration menu (Refer to step SC2 in FIG. 8) is read out.

In step SD2, it is determined whether the password read out in step SC6 (Refer to FIG. 8) is matches with the password for confirmation read out in step SD1. When the result of determination is "No", in step SD3, a message "The password is incorrect, try again." appears. The manager confirming the message determines that user registration has been unsuccessful, and carries out the operation of user registration from the beginning.

On the other hand, when the result of determination in step SD2 is "Yes", it is determined in step SD4 whether the user's position read out in step SC5 (Refer to FIG. 8) belongs to class A. The user's position is previously divided into three classes such as class A, class B, and class C, and a class database representing a relation between user's positions and classes is stored in the storage unit 101a. Accordingly, in step SD4, it is determined whether the user is a user of class A by referring to the class database.

In step SD4, assuming that the result of determination is "Yes", in step SD12, the user is determined as a user of class A. In the next step SD7, the entry information for "surveyor? (Y/N)" (information for identifying a surveyor) in the user registration menu shown in FIG. 8 is read out. When the information for identifying a surveyor is "Y", the user is registered in the user database as a surveyor.

In the next step SD8, the entry information for "approver? (Y/N)" (information for identifying an approver) in the user registration menu shown in FIG. 8 is read out. When the information for identifying an approver is "Y", the user is registered in the user database as the approver. In the next step SD9, the entry information for "pertinence determination surveyor? (Y/N)" (information for identifying a pertinence determination surveyor) in the user registration menu is read out. When the information for identifying a pertinence determination surveyor is "Y", the user is registered in the user database as the pertinence determination surveyor.

In the next step SD10, the entry information for "pertinence determination approver? (YIN)" (information for identifying a pertinence determination approver) in the user registration menu is read out. When the information for identifying a pertinence determination approver is "Y", the user is registered in the user database as a pertinence determination approver. In step SD11 the message "user registration is complete" is displayed, and the above-described user name, user's position, password, and user's class (class A in this case) are registered in the user database as information for the registered user.

On the other hand, when the result of determination in step SD4 is "No", it is determined in step SD5 whether the user is of class B by referring to the class database. When the result of determination is "Yes", in step SD13, the user is confirmed as a user of class B. The processing in step SD7 to step SD10 is then successively executed in the manner described above. In step SD11, the message "user registration is complete" appears, and then the above-described user name, user's position, password, and user's class (class B in this case) are registered in the user database as information for the registered user.

On the other hand, when the result of determination in step SD5 is "No", in step SD6, the user is determined as a user of class C. The processing in step SD7 to step SD10 is then successively executed in the same manner as explained above. In step SD11, the message "user registration is complete" appears, and then the above-described user name, user's position, password, and user's class (class C in this case) are registered in the user database as information for the registered user.

Thereafter, by carrying out the same processing for the other users, a user name, a user's position, a password, and a user's class for each user are registered in the user database of the storage unit 101a. User registration is carried out also in the server terminals 100b and 100c shown in FIG. 1 like the user registration executed in the server terminal 100a.

Document Registration/Acknowledgment Processing:—

The processing for document registration and acknowledgment of the document registration are described below with reference to FIG. 6, FIG. 10, FIG. 11, and FIG. 16. First of all, the processing for document registration is explained with reference to FIG. 6 and FIG. 10. At first, a manager (called a surveyor) of the server terminal 100a shown in FIG. 1 carries out "document registration" by using the management terminal 102a. Namely, when "document registration" is selected from the XML browser menu screen (Refer to FIG. 7), the event of document registration occurs, thus the result of determination in step SB2 shown in FIG. 6 shall be "Yes". Therefore, in step SE1 shown in FIG. 10, it is determined whether the input is an initial one. In this case, as the input is an initial one, the result of determination in step SE1 shall be "Yes".

With this operation, in step SE2, a document classification menu which shows classification of documents to be registered and selection numbers or the like appears as follows on the display 104a of the management terminal 102a, and then the processing in the event loop shown in FIG. 6 is again executed.

1. General document
2. Device master drawing
3. Logic circuit diagram
4. Analog circuit diagram
5. Printed board packing diagram
6. Component diagram
7. Printed board/device packing structure diagram
8. Test specification
9. Purchase specification
10. Assembly specification EC Number "general document" with selection number 1 is a document that is to be used inside or outside the company other than a draft drawing. "device master drawing" with selection number 2 is a drawing as a kind of draft drawings prepared by the design department and showing general configuration of the device. "logic circuit diagram" with selection number 3 is a drawing showing a logic circuit in the device. "analog circuit diagram" with selection number 4 is a drawing showing an analog circuit in the device. "printed board packing diagram" with selection number 5 is a drawing showing a state of components packed on a printed board.

"component diagram" with selection number 6 is a drawing showing configuration of components used in the device. "printed board/device packing structure diagram" with selection number 7 is a drawing showing a structure when a printed board is mounted on the device. "test specification" with selection number 8 is a document in which specifications of a test for checking operations of an assembled device are described. "purchase specification" with selection number 9 is a document in which specifications on purchase of each component forming the device are described. "assembly specification" with selection number 10 is a document in which specifications on assembly of the device are described. The documents (drawings) with selection numbers 2 to 10 are prepared in the design department. The column for an EC number is a column for inputting an EC number ("F2224Z2411") shown in FIG. 5 described above.

The surveyor inputs, for instance, the selection number 7 (printed board/device packing structure view) corresponding to a document to be registered from the document classification menu, and inputs, for instance, "F2224Z2411" as an EC number. In this case, as the event of document registration has occurred, the result of determination in step SB2 shown in FIG. 6 shall be "Yes", and further the result of determination in step SE1 shown in FIG. 10 shall be "No" because the input is not the initial one.

In the next step SE3, it is determined whether entry of the selection number in the document classification menu has been completed. As the selection number 7 (printed board/device packing structure view) has been inputted, the result of determination in step SE3 shall be "Yes". When the result of determination in step SE3 is "No", the registered data is displayed in step SE4.

In step SE5, the above-described management information (Refer to FIG. 4) prepared by a text editor is read out, and then a plurality of paper documents (printed board/device packing structure view) are optically read using the scanner 103*a*. The scanner 103*a* is not used for the document which is a text prepared by a word processor, or for the document which is a drawing prepared by CAD (Computer Aided Drawing) because these documents are already in digital form.

The electronic documents are classified into files in each format such as a pc (post script), a tiff (tag image file format), a gif (graphics interchange format), and an icad/sx (integrated computer aided design and manufacturing system/sx). In this case, a plurality of documents concerning the printed board/device packing structure diagram are read out as ps-format files of "CA41205-2449-01.ps", "CA41205-2449-02.ps", and "CA41205-2449-03.ps".

In the next step SE6, the EC number ("F2224Z2411") inputted by the surveyor is read out. Instep SE7, the selection number ("7" in this case) selected by the surveyor is read out, and in step SE8, a drawing number is assigned to the document read out in step SE5. Instep SE9, the date on which the document is registered is added thereto. In the next step SE10, an XML tag in the XML file $F_{XML}$ (Refer to FIG. 5) is decoded, and then the processing in the event loop shown in FIG. 6 is again executed.

When the surveyor selects "acknowledgment" on the XML browser menu screen (Refer to FIG. 7) by using the management terminal 102*a*, the event of acknowledgment occurs, thus the result of determination in step SB5 shown in FIG. 6 shall be "Yes". When "acknowledgment for document registration" is selected, the result of determination in step SK2 shown in FIG. 16 shall be "Yes", and in step SF1 shown in FIG. 11, it is determined whether the surveyor has input a password or not. When the result of determination is "No", the processing in the event loop shown in FIG. 6 is again executed.

When the surveyor inputs his password, the result of determination in step SF1 shall be "Yes". In step SF2, the password of the surveyor is collated with passwords of the surveyors previously registered and stored in the storage unit 101*a*. In step SF3, it is determined whether both of the passwords are coincident with each other. When the result of determination is "No", a message "The password is incorrect" is displayed in step SF4, and the processing in the event loop shown in FIG. 6 is again executed.

On the other hand, when the result of determination in step SF3 is "Yes", in step SF5 the surveyor is identified from the input password. In step SF6, it is determined whether the approver of document registration has input a password or not. When the result of determination is "No", the processing in the event loop shown in FIG. 6 is again executed. When the approver inputs his password, the result of determination in step SF6 shall be "Yes". Instep SF7, similarly to step SF2, the password of the approver is collated with passwords of the approvers previously registered and stored in the storage unit 101*a*. In step SF8, it is determined whether both of the passwords are coincident with each other. When the result of determination is "No", a message "The password is incorrect" is displayed in step SF9, and the processing in the event loop shown in FIG. 6 is again executed.

On the other hand, when the result of determination in step SF8 is "Yes", in step SF10 the approver is identified from the input password. In step SF11, management information concerning the documents read out in step SE5 (Refer to FIG. 10) is stored in the management information database of the storage unit 101*a* in correlation with the drawing numbers. In the next step SF12, the electronic documents (drawings) are stored in the document database of the storage unit 101*a* in a specified file format. Thereafter, a plurality of management information and documents are stored in the management information database as well as in the document database of the storage unit 101*a* by repeating the above-described processing for document registration and its acknowledgment respectively. Document registration is executed in the server terminals 100*b* and the server terminal 100*c* shown in FIG. 1 in the same manner as the document registration executed in the server terminal 100*a*.

Document Updating/Acknowledgment Processing:—

The processing for document updating and acknowledgment processing for the document updating are described below with reference to FIG. 6, FIG. 12, FIG. 13, and FIG. 16. First of all, the processing for document updating is explained with reference to FIG. 6 and FIG. 12. At first, a surveyor at the server terminal 10*a* shown in FIG. 1 carries out "updating" by using the management terminal 102*a*. The updating is executed when errors in designing and changes in designed specifications or the like have occurred. When "updating" is selected by the surveyor from the XML browser menu screen (Refer to FIG. 7), the event of updating occurs, thus the result of determination in step SB3 shown in FIG. 6 shall be "Yes". With this operation, in step SG1 shown in FIG. 12, it is determined whether the input is an initial one. In this case, as the input is an initial one, the result of determination in step SG1 shall be "Yes".

With this operation, in step SG2, an updating menu showing "drawing number" and "EC number" is displayed on the display 104a of the management terminal 102a, and then the processing in the event loop shown in FIG. 6 is again executed. The surveyor inputs a drawing number and an EC number of the document to be updated of those stored in the document database of the storage unit 101a. In this case, as the event of updating has occurred, the result of determination in step SB3 in shown in FIG. 6 shall be "Yes", and further the result of determination in step SG3 shown in FIG. 12 shall be "No" because the input is not the initial one.

In the next step SG3, it is determined whether input of the drawing number and the EC number in the updating menu has been completed. When the result of determination is "No", the registered data is displayed in step SG4. In this case, as the drawing number and EC number have been inputted, the result of determination in step SG3 shall be "Yes". In step SG5, the drawing number inputted by the surveyor is read out, and in step SG6, the EC number is read out. In step SG7, management information (Refer to FIG. 4) corresponding to the drawing number and EC number is read out from the management information database of the storage unit 101a. In step SG8, the document (drawing) corresponding to the drawing number is read out from the document database of the storage unit 101a. In step SG9, an XML tag in the management information read out in step SG7 is decoded, and then the processing in the event loop shown in FIG. 6 is again executed.

When the surveyor selects "acknowledgment" on the XML browser menu screen (Refer to FIG. 7) using the management terminal 102a, the event of acknowledgment occurs, thus the result of determination in step SB5 shown in FIG. 6 shall be "Yes". When "acknowledgment of updating" is selected, the result of determination in step SK3 shown in FIG. 16 shall be "Yes". In step SH1 shown in FIG. 13, it is determined whether the surveyor has input a password or not. When the result of this determination is "No", the processing in step SH6 is executed.

When the surveyor inputs his password, the result of determination in step SH1 shall be "Yes". In step SH2, the password of the surveyor is collated with the password of the surveyor previously registered and in the storage unit 101a. When the result of determination in step SH3 is "No", a message "The password is incorrect" is displayed in step SH4, and the processing in the event loop shown in FIG. 6 is executed.

On the other hand, when the result of determination in step SH3 is "Yes", in step SH5 the surveyor is identified from the input password. In step SH6, it is determined whether the approver of updating of a document has input a password or not. When the result of determination is "No", the processing in the event loop shown in FIG. 6 is again executed. When the approver inputs his password, the result of determination in step SH6 shall be "Yes". In step SH7, the password of the approver is collated with password of the approver previously registered and stored in the storage unit 101a. In step SH8, it is determined whether both of the passwords are coincident with each other. When the result of determination is "No", a message a "The password is incorrect" is displayed in step SH9, and the processing in the event loop shown in FIG. 6 is again executed.

On the other hand, when the result of determination in step SH8 is "Yes" in step SH10, the approver is identified from the input password. In step SH11, the management information read out in step SG7 (Refer to FIG. 12) is updated and stored in the management information database of the storage unit 101a as the updated management information. More specifically, the read-out management information is updated to that with the contents "F2224Z2411" of the tag <ECO/NRH> in the XML file $F_{XML}$. Namely, "Z" means that updating is executed to the information.

Further, in the DTD file $F_{DTD}$ shown in FIG. 4, the updating information for updated documents is updated, for instance, from version 01 to version 02, and at the same time updating information indicating that the updating has been done is additionally written in the file. In the next step SH12, the updated document (drawing) is stored in the document database of the storage unit 101a in a specified file format. Thereafter, updated management information and documents are stored in the management information database as well as in the document database of the storage unit 101a by repeating the above-described processing for document updating and its acknowledgment respectively. Document updating is executed in the server terminals 100b and the server terminal 100c shown in FIG. 1 in the same manner as the document updating executed in the server terminal 100a.

Document Abortion/Acknowledgment Processing:—

The processing for document abortion and acknowledgment processing for the document abortion is described below with reference to FIG. 6, FIG. 14, FIG. 15, and FIG. 16. First of all, the processing for document abortion is explained with reference to FIG. 6 and FIG. 14. At first, a surveyor at the server terminal 100a shown in FIG. 1 carries out "abortion" using the management terminal 102a. Namely, when "abortion" is selected from the XML browser menu screen (Refer to FIG. 7) by the surveyor, the event of abortion occurs, thus the result of determination in step SB4 shown in FIG. 6 shall be "Yes". With this operation, in step SI1 shown in FIG. 14, it is determined whether the input is an initial one. In this case, as the input is an initial one, the result of determination in step SI1 shall be "Yes".

With this operation, in step SI2, an abortion menu with a message "specify a drawing number" in it is displayed on the display 104a of the management terminal 102a, and then the processing in the event loop shown in FIG. 6 is again executed. The surveyor inputs a drawing number of the document to be aborted of those stored in the document database of the storage unit 101a. In this case, as the event of abortion has occurred, the result of determination in step SB4 in shown in FIG. 6 shall be "Yes", and further the result of determination in step SI1 shown in FIG. 14 shall be "No" because the input is not the initial one.

In the next step SI3, it is determined whether input of the drawing number in the abortion menu has been completed. When the result of determination is "No", the processing in the event loop shown in FIG. 6 is executed. In this case, as the drawing number of the drawing to be aborted has been inputted, the result of determination in step SI3 shall be "Yes". In step SI4, the drawing number inputted by the surveyor is read out, and in step SI5, management information corresponding to the drawing number is read out from the management information database of the storage unit 101a, and then the management information is displayed in step SI6. The processing in the event loop shown in FIG. 6 is then executed again.

When the surveyor selects "acknowledgment" on the XML browser menu screen (Refer to FIG. 7) using the management terminal 102a, the event of acknowledgment occurs, thus the result of determination in step SB5 shown in FIG. 6 shall be "Yes". When "acknowledgment of abortion" is selected, the result of determination in step SK4 shown in FIG. 16 shall be "Yes". In step SJ1 shown in FIG. 15, it is determined whether the surveyor has input a password or not. When the result of this determination is "No", the processing in step SJ6 is executed.

When the surveyor inputs his password, the result of determination in step SJ1 shall be "Yes". In step SJ2, the password of the surveyor is collated with the password of the surveyor previously registered and stored in the storage unit 101a. When the result of determination in step SJ3 is "No", a message "The password is incorrect" is displayed in step SJ4, and the processing in the event loop shown in FIG. 6 is again executed.

On the other hand, when the result of determination in step SJ3 is "Yes", in step SJ5 the surveyor is identified from the input password. In step SJ6, it is determined whether the approver of abortion of a document has input a password or not. When the result of determination is "No", the processing in the event loop shown in FIG. 6 is again executed. When the approver inputs his password, the result of determination in step SJ6 shall be "Yes". In step SJ7, the password of the approver is collated with the password of the approver previously registered and stored in the storage unit 101a. In step SJ8, it is determined whether both of the passwords are coincident with each other. When the result of determination is "No", a message "The password is incorrect" is displayed in step SJ9, and the processing in the event loop shown in FIG. 6 is again executed.

On the other hand, when the result of determination in step SJ8 is "Yes", in step SJ10 the approver is identified from the input password. In step SJ11, XML tag information of <article> Abortion </article> is written in the management information read-out in step SI5 (Refer to FIG. 14). With this operation, the history that the document (drawing) has been aborted remains. In step SJ12, the file of the document (drawing) to be aborted is deleted from the document database of the storage unit 101a. Document abortion is executed in the server terminals 100b and the server terminal 100c shown in FIG. 1, in the same manner as the document abortion executed in the server terminal 100a.

Pertinence Determination/Acknowledgement Processing:—

The processing for determining pertinence and processing for acknowledging the result of the pertinence determination processing is described below with reference to FIG. 6, FIG. 17, FIG. 18 and FIG. 16. The pertinence determination processing is explained below with reference to FIG. 16 and FIG. 17. At first, a surveyor at the server terminal 100a shown in FIG. 1 executes "pertinence determination" using the management terminal 102a. Namely, when "pertinence determination" is selected on the XML browser menu screen (Refer to FIG. 7) by the surveyor, the event of pertinence determination occurs, thus the result of determination in step SB6 shown in FIG. 6 shall be "Yes". In response to this operation, instep SL1 shown in FIG. 17, it is determined whether the input is an initial one. In this case, as the input is an initial one, the result of determination in step SL1 shall be "Yes".

In step SL2, a pertinence determination menu containing an instruction "specify a drawing number" is displayed on the display unit 104a of the management terminal 102a, and then the processing in the event loop shown in FIG. 6 is again executed. The surveyor inputs a drawing number of a document to be subjected to pertinence determination of those stored in the document database of the storage unit 101a. In this case, as the pertinence determination event has occurred, and further as the input is not an initial one, the result of determination in step SL1 shown in FIG. 17 shall be "No".

In the next step SL3, the Export Control Law database is read out from the storage unit 101a. This Export Control Law database is a database consisting of a plurality types of determination information for determining a pertinence determination level (VS level, S level, and B level) based on considerations to the Export Control Law. In step SL4, the Foreign Exchange Law database is read out from the storage unit 101a. The Foreign Exchange Law database is a database consisting of a plurality types of determination information for determining the pertinence determination level (VS level, S level, and B level) based on considerations to the Foreign Exchange Law.

The VS level is a level at which distribution of documents to a foreign country must be made with the highest degree of carefulness. Accordingly, at the VS level, a group of distribution-allowable countries consisting of a plurality of destination countries to which the document may be sent (described as distribution-allowable country at the VS level hereinafter) is previously decided. The S level is a level at which transmission of documents to a foreign country may be made on conditions slightly milder as compared to those at the VS level. At this S level, a group of distribution-allowable countries consisting of a plurality of destination countries to which the document may be sent (described as distribution-allowable country at the S level hereinafter) is also previously decided. The B level is a level at which transmission of documents to a foreign country may be made according the mildest conditions. At this B level, a group of distribution-allowable countries consisting of a plurality of destination countries to which the document may be sent (described as distribution-allowable country at the B level hereinafter) is also previously decided.

In the next step SL5, it is determined whether a question 1 for determination as to whether a document identified according to the drawing number selected in the pertinence determination menu (Refer to step SL2) is at the VS level is to be made. In this case, as the question 1 is not made, the result of this determination shall be "Yes". The question 1 is displayed in step SL6, and the processing in the event loop shown in FIG. 6 is again executed. This question 1 is prepared based on determination information obtained from the Export Control Low as well as from the Foreign Exchange Law database. The question 1 maybe, for instance, "Does the field of a document having this drawing number correspond to the field Y1 put under controls by the Export Control Law and the field G1 put under controls by the Foreign Exchange law?".

The surveyor inputs "Yes" or "No" as an answer 1 to the question 1 above. When the surveyor inputs "Yes" as the answer 1, the result of determination in step SL7 shall be "Yes". With this operation, in step SL8, it is determined that a pertinence determination level of the document having the drawing number is VS level, and then the processing in the event loop shown in FIG. 6 is again executed.

On the other hand, when "No" is inputted as the answer 1, the result of determination in step SL7 shall be "No". With this operation, in the next step SL9, it is determined whether a question 2 for determination as to which of the S level and B level the document identified according to the drawing number selected in the pertinence determination menu (Refer to step SL2) belongs to is to be made. In this case, as the 2 is not made, the result of determination is "Yes", and after the question 2 is displayed in step SL10, the processing in the event loop shown in FIG. 6 is again executed. The question 2 is prepared based on the determination information obtained from the Export Control Law database as well as from the Foreign Exchange Law database. The contents of the question 2 is, for instance, "Does the field of a document having this drawing number correspond to the field Y2 put under controls by the Export Control Law and the field G2 put under controls by the Foreign Exchange law?".

The surveyor inputs either "Yes" or "No" as an answer 2 to the question 2. When the surveyor inputs "Yes" as the answer 2, the result of determination instep SL11 shall be "Yes". With this operation, in step SL12, it is determined that the pertinence determination level for the document having the drawing number is S level, and then the processing in the event loop shown in FIG. 6 is again executed. On the other hand, when "No" is inputted as the answer 2, the result of determination in step SL11 shall be "No". With this operation, it is determined that the pertinence determination level for the document having the drawing number is B level, and then the processing in the event loop shown in FIG. 6 is again executed.

When the surveyor having made the pertinence determination selects "acknowledgement" on the XML browser menu screen (Refer to FIG. 7) using the management terminal 102a, the event of acknowledgement occurs, and the result of determination in step SB5 shown in FIG. 6 shall be "Yes". When "pertinence determination" is selected, the result of determination in step SK5 shown in FIG. 16 shall be "Yes". It is determined in step SM1 shown in FIG. 18 whether the surveyor has input a password or not. When the result of determination is "No", it is determined in step SM8 whether the approver has input a password or not. When the result of this determination is "No", the processing in the event loop shown in FIG. 6 is again executed.

When the surveyor inputs his password, the result of determination in step SM1 shall be "Yes". In step SM2, it is determined whether the surveyor is a pertinence determination surveyor. More specifically, the above fact is determined by checking whether the surveyor is included in the list of pertinence determination surveyors previously registered and stored in the storage unit 101a.

When the result of determination in step SM2 is "No", an error message "The surveyor is not qualified for pertinence determination" is displayed, and the processing in the event loop shown in FIG. 6 is again executed. Namely, in this case, the surveyor having tried to determine pertinence is not a qualified person for pertinence determination. On the other hand, when the result of determination in step SM2 is "Yes", in step SM4, the password of the surveyor is collated with the password of the surveyor previously registered and stored in the storage device 101a. When the result of determination in step SM5 is "No", a message "The password is incorrect" is displayed in step SM6, and the processing in the event loop shown in FIG. 6 is again executed.

On the other hand, when the result of determination in step SM5 is "Yes", in step SM7 the surveyor is identified from the input password, and then in step SM8, it is determined whether the approver has input a password or not. When the result of determination is "No", the processing in the event loop shown in FIG. 6 is again executed. When the approver inputs his password, the result of determination in step SM8 shall be "Yes". In step SM9, it is determined whether the approver is the approver of pertinence determination. More specifically, the above fact is determined by checking whether the approver is included in the list approvers of pertinence determination previously registered and stored in the storage unit 101a.

When the result of determination in step SM9 is "No", in step SM17, an error message "The approver is not qualified for pertinence determination" is displayed, and the processing in the event loop shown in FIG. 6 is again executed. Namely, in this case, the approver having tried to do pertinence determination is a person not qualified for pertinence determination. On the other hand, when the result of determination in step SM9 is "Yes", in step SM10, a password of the approver is collated with the password of the approver previously registered and stored in the storage unit 101a. When the result of determination in the next step SM11 is "No", in step SM12, the message "The password is incorrect" is displayed, and the processing in the event loop shown in FIG. 6 is again executed.

On the other hand, when the result of determination in step SM11 is "Yes", in step SM13, the approver is identified from the input password. In the next step SM14, a determination level determined in the processing for pertinence determination (step SL8, step SL12, or step SL13) sown in FIG. 17 is written in the XML file $F_{XML}$ (Refer to FIG. 5). More specifically, when the determination level is "VS", "VS" is written in the <result of pertinence determination> tag shown in FIG. 5. With this operation, the document is treated as that at the pertinence determination level of VS.

In the next step SM15, a name of the surveyor identified in step SM7 is written in the XML file $F_{XML}$ (Refer to FIG. 5). More specifically, when a name of the surveyor is "Tadashi Ohashi", "Tadashi Ohashi" is written in the <pertinence determination surveyor> tag shown in FIG. 5. In the next step SM16, the name of the approver identified in step SM13 is written in the XML file $F_{XML}$ (Refer to FIG. 5), and then the processing in the event loop shown in FIG. 6 is again executed. More specifically, when the name of the approver is "Tadashi Ohashi", "Tadashi Ohashi" is written in the <pertinence determination surveyor> tag shown in FIG. 5.

Processing for Distribution:—

The processing for distribution (distribution processing) is described below with reference to FIG. 6 and FIG. 19. At first, when a surveyor at the server terminal 100a shown in FIG. 1 (or server terminals 100a, 100b, clients 300a, 300b, 300c) selects "distribution" on the XML browser menu screen (Refer to FIG. 7), the result of determination in step SB7 shown in FIG. 6 shall be "Yes". With this, in step SN1 shown in FIG. 19, it is determined whether the input is an initial one.

In this case, as the input is an initial one, the result of determination in step SN1 shall be "Yes". With this operation, in step SN2, a menu for distribution processing is displayed, and then the processing in the event loop shown in FIG. 6 is executed. This menu consists of the menu items of "1. Specify a drawing number" and "2. Is the document distributed to a foreign counter? Country name=( ), Receiver's name=( )". The drawing number is a number concerning a desired document, the country name is a name of a country to which the document is distributed, and the receiver's name is a name of a person who receives the document.

When entry into the menu items above is over, the result of determination in step SN1 shall be "No", as input to the menu item is over, the result of determination in step SN3 shall be "Yes". When the entry is not over, the result of determination in step SN3 shall be "No", and the processing in the event loop shown in FIG. 6 is again executed. In the next step SN4, management information corresponding to the inputted drawing number is read out from the management information database in the storage unit 101a, and in step SN5, it is determined from the inputted country name whether the document is to be distributed to a domestic surveyor. More specifically, when the country name is Japan, it is determined that the document is set to a destination in Japan, so that the result of determination in step SN5 shall be "Yes", and the processing in step SN10 is executed.

On the other hand, when a country name is not Japan, it is determined that the document is to be distributed to a foreign country, so that the result of determination in step SN5 shall be "No". In step SN6, contents of the <result of pertinence determination> tag in the XML file $F_{XML}$ (Refer to FIG. 5) for management information is read out, and then the inputted country name is read out step SN7. In step SN8, it is determined according to the result of pertinence determination above whether the country is a distribution-allowable country. When the result of determination is "No", the processing in step SN9 is executed. In step SN9, a message "Distribution is not allowable according to the result of pertinence determination" is displayed, the management information and document are not distributed, and the processing in the event loop shown in FIG. 6 is again executed.

On the other hand, when the result of determination in step SN8 is "Yes", contents (a level of importance) in the <importance degree> tag in the XML file $F_{XML}$ (Refer to FIG. 5) for management information is read out, and in step SN11, it is determined whether the importance degree is VH. When the result of determination in this step is "Yes", in step SN12, it is determined whether the inputted receiver's name matches contents of the <destination for distribution> tag in the XML file $F_{XML}$. When the result of determination is "Yes", the management information and document are distributed to the client 300a via the network 200.

When the result of determination in step SN12 is "No", a message "The destination for distribution (receiver) is not allowable" is displayed in step SN17, the management information and document are not distributed, and the processing in the event loop shown in FIG. 6 is again executed. On the other hand, when the result of determination in step SN11 is "No", it is determined in step SN14 whether the importance degree is H level. When the result of determination is "Yes", in step SN15, the management information and document are distributed to users at the importance degree at H level. On the other hand, when the result of determination in step SN14 is "No", in step SN16, the importance degree is recognized as G level, and the management information and document are distributed to all users.

Processing for Receiving:—

Figure 21:
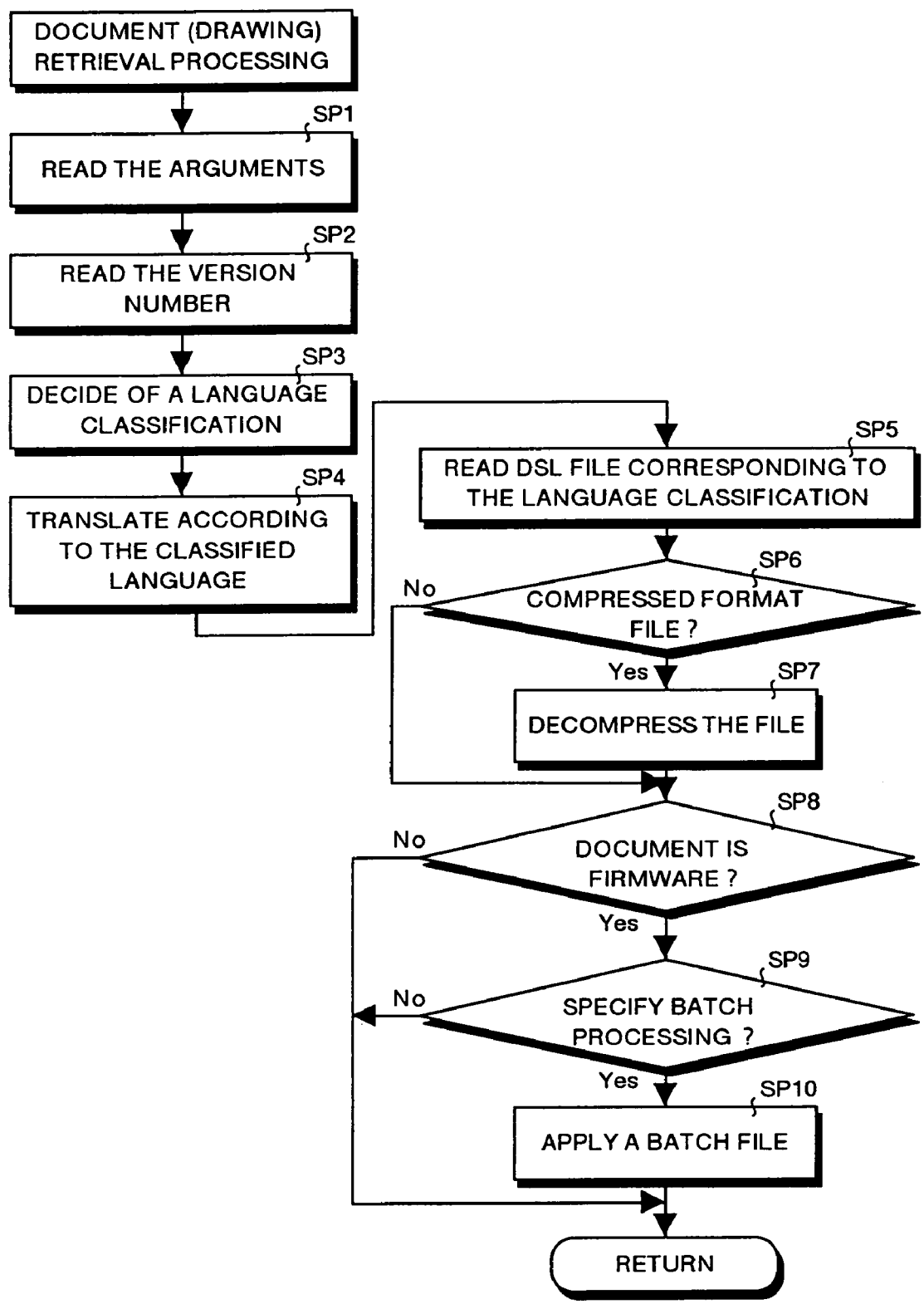
FIG. 21 is a flow chart showing the processing for retrieving a document (drawing) in this embodiment.

The processing for receiving at the client 300a-(300b, 300c) is described below with reference to FIG. 21 to FIG. 23. This processing for receiving includes the processing for receiving an E-mail 500a (500b, 500c) via the network 200 from the server terminal 100a (100b, 100c), and processing for receiving management information and documents via the network 200 from the server 100a (100b, 100c).

The server terminal 100a executes the processing for updating described above, and transmits updating information such as a drawing number, a version number, a drawing name or the like of the updated document as an E-mail 500a to the client 300a (300b, 300c). However, the server terminal 100a does not transmit updating information for all of the updated documents as the E-mail 500a to the client 300a (300b, 300c) in batch, but transmits updating information for a document retrieved through the processing described later as the E-mail 500a to the retrieving client. The server terminals 100s and 100c also transmit E-mails 500b and 500c to the retrieving clients respectively like the server terminal 100a.

On the other hand, the retrieving clients 300a, 300b, 300c transmit retrieval information for the retrieved document such as a drawing number, a version number, a drawing name or the like as E-mails 600a, 600b, and 600c via the network 200 to the retrieved server terminal. With this operation, the retrieved server terminal has the updating information stored in the storage unit, and transmits an E-mail to a retrieving client by referring to the retrieval information after updating processing.

Details of the processing for receiving are described below. When the item of "reception" on the XML browser menu screen (Refer to FIG. 7) is selected by a surveyor (receiver), for instance, at the client 300a shown in FIG. 1, the event of reception occurs, and the result of determination in step SB8 shown in FIG. 6 shall be "Yes". In response to this operation, it is determined in step SO1 shown in FIG. 20 whether the E-mail has been received. The E-mail is any of the E-mails 500a, 500b, 500c each including the updating information described above.

In this case, when the result of determination in SO1 is "No", in step SO5, it is determined whether the input is an initial one. When the result of determination is "Yes", instep SO6, a menu for the processing for receiving is displayed, and the processing in the event loop shown in FIG. 6 is again executed. This menu consists of items "device" and "version number" for inputting a drawing number and a version number of a device master drawing for the device, items "drawing number" and "Version number" for inputting a drawing number and a version number of a document to be received, and item "destination for application" for inputting a destination for application of the document. The receiver makes entry into required items on the menu. Forms of entry include a device-specifying entry in which necessary data is inputted to the items "device", "version number", and "destination for application", and a drawing number-specifying entry in which necessary data is inputted to the "drawing number", "version number", and "destination for application".

In step SO7, it is determined whether the entry is finished, and when the result of determination in the step is "No", the processing in the event loop shown in FIG. 6 is again executed. When it is determined that the entry has been finished, the result of determination in step SO7 is "Yes", and in step SO8, it is determined whether the device-specifying entry was made. In this case, when the result of determination in step SO8 is "Yes", in step SO9, the inputted drawing number (device number) of the device master drawing and version number thereof are read, and in step SO10, the inputted destination for distribution is read out.

In step SO11, according to the drawing number of the device master drawing and a version number thereof, a master SK for the device (Refer to FIG. 3; management information PK) is retrieved, for instance, from the management database in the storage unit 101a via the network 200 to the client 300a. This master SK includes a list consisting of a "logic circuit diagram" which is a slave SK of the device master drawing as shown in FIG. 23, a "printed board packing drawing", a "component diagram", a "printed board/device packing structure diagram", "firmware", "purchase specification", "test specification", and "assembly specification".

In the next step SO12, the destination for application read out the step SO10 is decided as a regular destination for application, and then in step SO13, the document (drawing) retrieval processing by specifying a device is executed. This document (drawing) retrieval processing is described with reference to the flow chart shown in FIG. 21. In step SP1 in this figure, a drawing number, a version number, an EC number, and a destination for presentation in the item 1 "logic circuit diagram" shown in FIG. 23 are read out as arguments, and in step SP2, management information for the "Logic circuit diagram" is retrieved from the management information database in the storage unit 101a according to the drawing number and version number above. In the next step, documents having the version number are read out from the document database according to version number information of documents in the DTD file $F_{DTD}$ in the management information.

In the next step SP3, a classification of a language to be used for the document is decided according to the contents of the <destination for presentation> tag in the XML file $F_{XML}$ in the management information. More specifically, a list of languages for destinations for distribution showing a correspondence between destinations for distribution and classifications of languages shown in FIG. 22 is referred to with a language classification decided from the destination for distribution. In step SP4, the management information is translated from Japanese to the pertinent language according to the language classification decided in step SP3. In the next step SP5, a DSL file $F_{DSL}$ for specifying a style to be used when a document corresponding to the language classification is read out this DSL file $F_{DSL}$, for instance, data concerning fonts, font sizes, initial margin values, line space or the like is included.

In step SP6, it is determined whether the document read out step SP2 is one based on a compressed format file. When the result of determination is "Yes", in step SP7, the document is file-decompressed and an execution format file is generated. On the other hand, when the result of determination in step SP6 is "No", in step SP8, it is determined whether the document is firmware (software). When the result of determination in this step is "Yes", in step SP9, it is determined whether patch specification for rewriting an instruction for execution of an absolute address in the execution format file (firmware) has been made. When the result of this determination is "Yes", in step SP10, the execution format file (firmware) is executed. On the other hand, when the result of determination in step SP8 or step SP9 is "No", the processing in step SO13 shown in FIG. 20 is executed.

In the next step SO14, documents having a specified version number for the logic circuit diagram read out step SP2 (Refer to FIG. 21) is displayed on the display unit 306a, and then the processing in step SO15 is executed. This operation for display is executed under controls by the MXL browser 302a. In step SO15, it is determined whether all of documents in the SK list shown in FIG. 23 has been displayed on the display unit 306a. In this case, only documents concerning a logic circuit diagram are displayed, so that the result of determination in step SO15 is "No" with the processing in step SO13 executed again, and the operating sequence described above is repeated.

With this operation, documents concerning the printed board packing diagram (Item 2) and having a specified version number, documents concerning the component diagram (Item 3) and having a specified version number or the like are successively retrieved from the document database and displayed on the display unit 306a. When all of the documents has been displayed, the result of determination in step SO15 shall be "Yes", and the processing in the event loop shown in FIG. 6 is again executed.

On the other hand, when the result of determination in step SO8 is "No", in other words, when a drawing number and a version number thereof are inputted, in step SO16, the inputted drawing number and a version number thereof are read, and then in step SO17 the inputted destination for application is read out. In the next step SO18, the document (drawing) retrieval processing for retrieving a document having a specified drawing number from the document database is executed. Namely in step SP1 shown in FIG. 21, an EC number and a destination for presentation in the item 1 "logic circuit diagram" shown in FIG. 23 is read, and then in step SP2, the management information concerning the "logic circuit diagram" is retrieved according to the drawing number and version number from the management information database in the storage unit 101a. According to the version number information for the document in the DTD file $F_{DTD}$ in the management information, documents having the version number are read from the document database.

In the next step SP3, like in the operating sequence described above, a classification of a language to be used for the document is decided, and in step SP4, the management information is translated from Japanese to the language according to the language classification. In the next step SP5, the DSL file $F_{DSL}$ corresponding to the language classification is read, and in step SP6, it is determined whether the document read out step SP2 is one based on the compressed format file. When the result of determination in the step is "Yes", the document is file-decompressed, and the execution format file is generated. On the other hand, when the result of determination in step SP6 is "No", in step SF8, it is determined whether the document is firmware (software).

When the result of determination in this step is "Yes", in step SP9, it is determined whether patch specification has been made, and when the result of determination is "Yes", in step SP1, the execution format file (firmware) is executed. On the other hand, when the result of determination in step SP8 or step SP9 is "No", the processing in step SO18 shown in FIG. 20 is again executed.

In step SO19, the documents concerning a logic circuit diagram and having a specified version number read out step SP2 (Refer to FIG. 21) are displayed on the display unit 306a. In the next step SO20, the client 300a transmits the retrieval information concerning the retrieved document as an E-mail 600a to the retrieved server terminal 100a, and the processing in the event loop shown in FIG. 6 is again executed. When the result of determination in step SO15 is also "Yes", the retrieval information may be transmitted as the E-mail 600a to the retrieved server terminal 10a. The server terminal 100a has the retrieval information stored in the storage unit 101a.

When the document retrieved in the server terminal 100a is updated, the server terminal 100a transmits updating information such as a drawing number, a version number, a drawing name or the like of the updated document as the E-mail 500a to the client 300a by referring to the retrieval information. With this, the result of determination in step SO1 shown in FIG. 20 shall be "Yes", and in step SO2, it is determined whether a filter has been set. The filter decides, when prespecified conditions are satisfied, whether the received E-mail 500a is to be ignored. For instance, when the E-mail 500*a* concerning a standardized document is received, or when the E-mail 500*a* concerning a document received in the past is received, the received E-mail 500*a* is ignored. When these two conditions are not satisfied, contents of the E-mail 500*a* is regarded as valid.

When the result of determination in step SO2 is "yes", in step SO3, when the two conditions described above are satisfied, contents of the E-mail 500*a* is ignored by masking the E-mail receiving function. On the other hand, when the result of determination is step SO2 is "Yes", updating information (a drawing number, a version number, and a drawing name) are obtained from the E-mail 500*a*, and this updating information is displayed on the display unit 306*a*. With this updating information, updating of a document retrieved previously is recognized with the processing described above executed, thus the updated document being retrieved.

Processing for Copying:—

The copy processing is described below with reference to FIG. 6 and FIG. 24. The copy processing is one for copying (making a hard copy of) an electronic data received, for instance, by the client 300*a* (user X) from the server terminal 100*a* (100*b*, 100*c*) via the network 200 by using a printer 305*a*. The client 300*b* and client 300*c* also copy (make a hard copy of) the electronic document with the printer 305*b* and printer 305*c* through the copy processing described below.

When "copy" is selected on the XML browser menu screen (Refer to FIG. 7) by a surveyor (operator) at the client 300*a* shown in FIG. 1, the event of copy occurs, and the result of determination in step SB9 shown in FIG. 6 shall be "Yes". With this, in step SQ1 shown in FIG. 24, it is determined whether contents of the <importance degree> tag in the XML file $F_{XML}$ (Refer to FIG. 5) concerning the received document to be copied is "VH". When the result of determination is "Yes", in step SQ10, a warning message "Copying inhibited" is displayed, and the processing in the event loop shown in FIG. 6 is again executed without the document being copied.

When the result of determination in step SQ1 is "No", it is determined whether the <copying inhibited> tag indicating inhibition of copying is present in the XML file $F_{XML}$. When the result of determination is "Yes", in step SQ10, the alarm message "Copying inhibited" described above is displayed, and the processing in the event loop shown in FIG. 6 is again executed without copying the document. On the other hand, when the result of determination in step SQ2 is "No", in step SQ3, it is determined whether there is the <warning> tag in the XML file $F_{XML}$. This <warning> tag indicates that the document should be treated carefully.

When the result of determination in the step SQ3 above is "Yes", a warning message, for instance, "Careful treatment required", which is contents of the <warning> tag is taken out. In the next step SQ12, the warning message "Careful treatment required" is displayed in a blank section of the document, and then in step SQ7, it is determined whether log for the document specific information is to be collected.

The term "log" indicates such information as validity or a drawing number of the document. When the result of determination in step SQ7 is "Yes", the log is collected and stored. Then in step SQ9, a request for copying the document specific information is issued to the printer 305*a*, and the processing in the event loop shown in FIG. 6 is again executed. With this, the document is printed using the printer 305*a*. On the other hand, when the result of determination in step SQ7 is "No", the processing in step SQ9 is executed.

On the other hand, when the result of determination in step SQ3 is "No", in step SQ4, it is determined whether there is the <overlay> tag in the XML file $F_{XML}$. The <overlay> tag means, for instance, overlaid the characters (e.g., overly "Abort after use" on the existing matter>. In this case, when the result of determination in step SQ4 is "Yes", characters to be overlaid are taken out, and in step SQ6, the overlaid characters are superimposed on the drawing (document).

In the next step SQ7, it is determined whether log is to be collected as described above, and when the result of determination in this step is "Yes", in step SQ8, log is collected and stored. In step SQ9, printing is requested to the printer 305*a*. With this operation, a drawing (document) including the overlaid characters of "Abort after use" is printed in the printer 305*a*. On the other hand, when the result of determination in step SQ4 is "No", the processing in step SQ7 is executed.

As described above, according to the embodiment of the present invention described above, information concerning correlation among documents and information concerning a version number are included in the management information, and further a plurality of documents are previously registered in a document database, and a plurality of documents forming a hierarchical structure can automatically be retrieved by specifying a required device at the client 300*a* (300*b*, 300*c*) according to the management information, so that manual operations for document management by a document manager as required in the conventional technology is not necessary, and also required documents can accurately and quickly be acquired through the network 200. Further, by specifying a drawing number, a plurality of documents belonging to the same layer can also accurately and quickly be acquired.

Further, each time a document is updated, the document stored in a document database and management information for the document are registered and updated. Therefore, updating work, which is a bottleneck in the conventional technology, can accurately and quickly be executed, and always document can be retrieved according to the most update version number.

Further, the client 300*a* transmits the E-mail 600*a* as retrieval information to a server terminal, and also the server terminal 100*a* transmits the E-mail 500*a* as updating information to the client 300*a* when a document is updated. Therefore, a user at the client 300*a* can immediately acquire updating information concerning a retrieved document, and because of this feature, an updated document can accurately and quickly be acquired.

Further, information concerning a security level such as the result of pertinence determination or an importance degree is included in management information. Therefore, it is possible to permit retrieval of certain documents to some users and at the same time to inhibit retrieval of the document to other users according to the security level, which makes it possible to obtain a system with high security.

Detailed description of one embodiment of the present invention has been presented with reference to the related drawings above, but the present invention is not limited to this embodiment, and various modifications and changes are possible within a gist of the present invention. For instance, in the embodiment described above, a document retrieval program for realization of the functions described above may be recorded in a computer-readable recording medium 1000 shown in FIG. 25 so that the functions are realized by making a computer read out and execute the document retrieval program recorded in the recording medium 1000.

Figure 25:
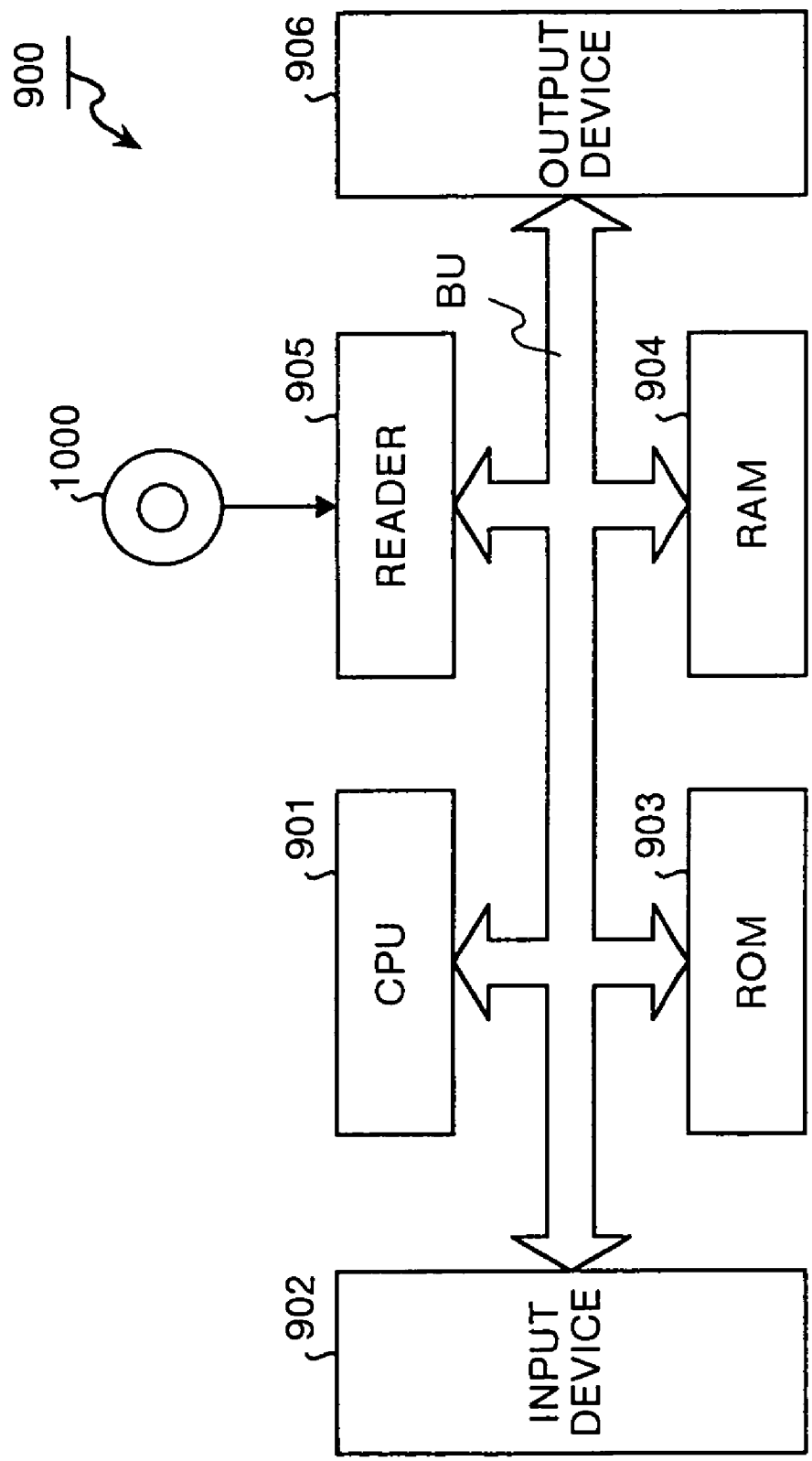
FIG. 25 is a block diagram showing a variant of this embodiment.
Figure 26:
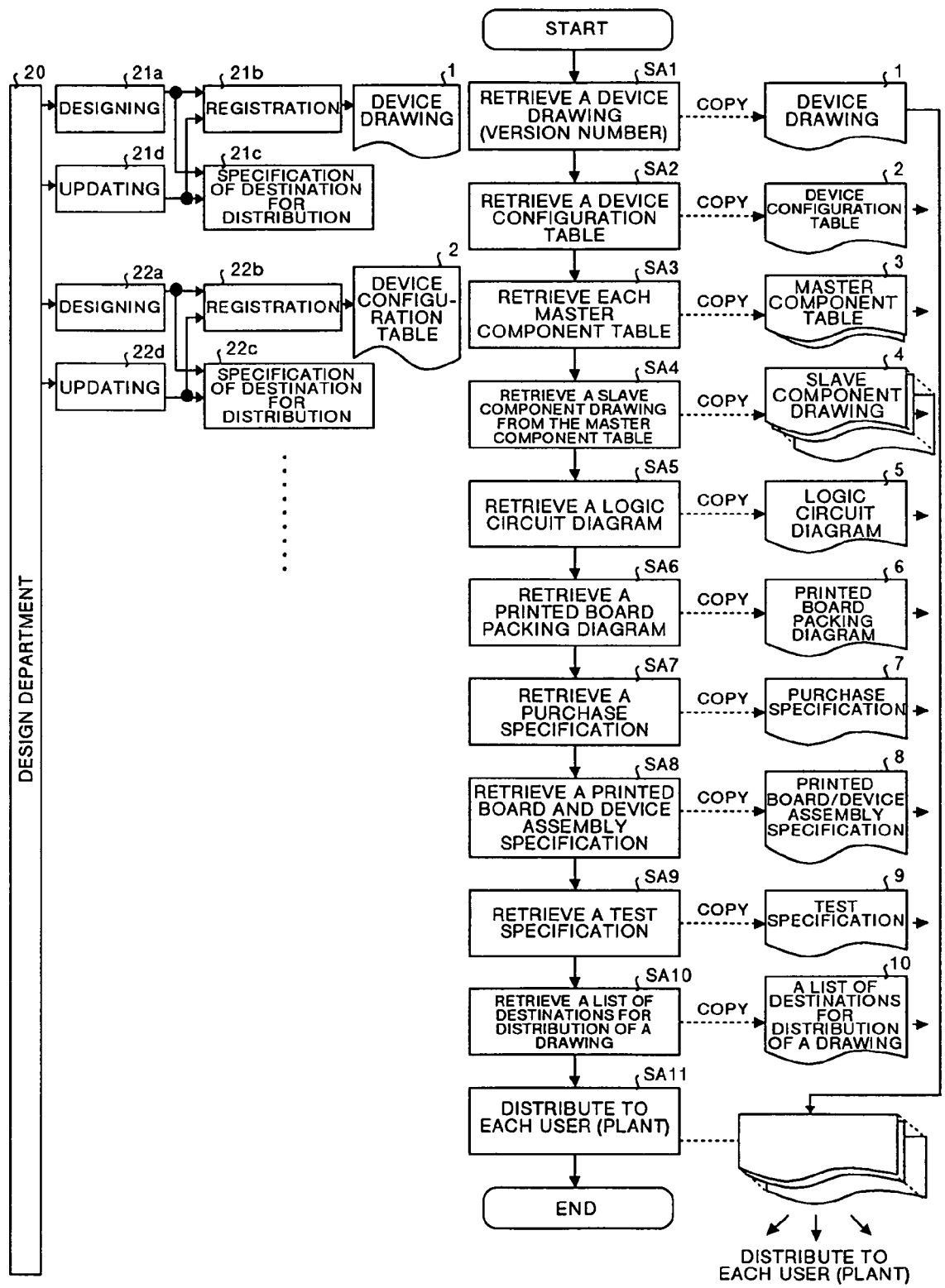
FIG. 26 is a view showing a document management method based on the conventional technology.

A computer 900 shown in FIG. 25 comprises a CPU 901 which executes the document retrieval program, an input device 902 such as a keyboard and a mouse, a ROM (Read Only Memory) 903 which stores therein various types of data, a RAM (Random Access Memory) 904 which stores therein operational parameters, a reader 905 which reads the document retrieval program from the recording medium 1000, an output device 906 such as a display unit and a printer, and a bus BU for connecting device components to each other.

The CPU 901 reads the document retrieval program stored in the recording medium 1000 using the reader 905, and executes each of the operations described above by executing the document retrieval program. The recording medium 100 includes, not only a portable type of recording medium such as an optical disk, a floppy disk, and a hard disk, but also a transfer medium for temporally storing data therein such as a network.

In the embodiment described above, the document database and management information database are stored in one storage unit 101a, but also the databases may be distributed to three storage units 101a to 101c and a desired document may be retrieved from any of the distributed document databases. Further, the type of document is not limited to any specific one, and the present invention can be applied to management of any types of documents including a drawing, a text document, a chart, or the like.

As described above, in the present invention, information indicating correspondence among documents and version number information are included in management information, a plurality of documents are previously registered in a document database, and documents required by a user are retrieved as a plurality of documents forming a hierarchical structure at a client according to the management information. Therefore, there is provided the advantage that manual operation for management of documents by an operator as required in the conventional technology is not necessary and required documents can accurately and quickly be acquired through a network.

Further, when a client accesses a server via a network, management information relating to the same layer is read out from the management information database, and further a plurality of documents belonging to the same layer are retrieved from the document database according to information concerning a collection of documents on the same layer as well as on a version number of each document obtained from the management information. Therefore, there is provided the advantage that, in addition to a plurality of documents forming a hierarchical structure, also each discrete document of the plurality of documents belonging to the same layer can accurately and quickly be acquired.

Further, each time a document is updated, the data on the updated document stored in the document database and management information therefor are registered and updated. Thus, the work for updating a document, which has been a bottleneck in the conventional technology, is executed accurately and quickly. Therefore, there is provided the advantage that always a document can be retrieved according to the most update version number.

Further, a client transmits retrieval information to a server, and when a document is updated, the server transmits updating information to the client. Thus, the client can immediately acquire updating information concerning retrieved documents. Therefore, there is provided the advantage that an updated document can accurately and quickly be acquired.

Further, information concerning a security level is included in the management information, and it is possible to permit retrieval of certain documents to some users and at the same time to inhibit retrieval of the documents to other users according to the security level. Therefore, there is provided the advantage that a system with high security can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An integrated document management system comprising:
   a storage unit which stores therein a document database comprising a plurality of documents that are files together forming a hierarchical structure comprising an upper hierarchy layer and a lower hierarchy layer ranked below the upper hierarchy layer where document files, each containing a document, in the lower hierarchy are referenced above in the upper hierarchy layer, where the structure is defined with hypertext described in an extensible markup language (XML);
   a management information database comprising management information comprising an XML file defining the hierarchical structure by indicating a relation between a document in the upper hierarchy layer and a document in the lower hierarchy layer, a document type definition file describing information on a version number of each document, and a document style sheet file defining a style of each document, where the document in the upper hierarchy layer is separate and distinct from the document in the lower hierarchy layer;
   a server connected to said storage unit and provided with a manager of the documents;
   a client connected via a network to said server and retrieves together, based on the management information, by accessing said server, both the document in the upper hierarchy layer and the document in the lower hierarchy layer each having a specified version number, from the document database; and
   a printer connected to the client, the printer making a hard copy of a document displayed at the client;
   wherein the printer makes the hard copy of the document displayed at the client, including overlaid predetermined characters, in response to a tag in the XML file being included in the management information which instructs to overlay the predetermined characters superimposed on the document displayed at the client, when copying is selected at the client, when the document is determined to be printed according to importance degree thereof, and when the management information includes the tag in the XML file, and
   the management information includes information related to a security level corresponding to each of the plurality of documents, and said server displays a warning message coping permitted or copying inhibited of document according to the security level, and the security level is dependent upon a pertinence determination level based on a predetermined rule.

2. The integrated document management system according to claim 1, wherein the management information includes information indicating a collection of a plurality of documents in a same layer and each version number of the plurality of documents, and said client retrieves, based on the management information, by accessing from said server the collection of the plurality of documents in the same layer, the documents retrieved each having a specified version number, from the document database.

3. The integrated document management system according to claim 1, wherein said server registers, when a document registered in the document database is updated, the updated document in the document database, and also updates the version number information in the management information related to the document.

4. The integrated document management system according to claim 3, wherein said client sends via the network to said server retrieval information for a document that has been retrieved, and said server sends via the network to said client, when a document corresponding to the retrieval information is updated, updating information related to the document updated.

5. A document retrieval device used in an integrated document management system having
   a storage unit which stores therein a document database comprising a plurality of documents that are files together forming a hierarchical structure comprising an upper hierarchy layer and a lower hierarchy layer ranked below the upper layer hierarchy where document files, each containing a document, in the lower hierarchy are referenced above in the upper hierarchy layer, where the structure is defined with hypertext described in an extensible markup language (XML);
   a management information database comprising management information comprising an XML file defining the hierarchical structure by indicating a relation between a document in the upper hierarchy layer and a document in the lower hierarchy layer, a document type definition file describing information on a version number of each document, and a document style sheet file defining a style of each document, where the document in the upper hierarchy layer is separate and distinct from the document in the lower hierarchy layer; and
   a server connected to said storage unit and provided with a manager of the documents, said document retrieval device retrieving together, based on the management information, both the document in the upper hierarchy layer and the document in the lower hierarchy layer in a specified version number from the document database;
   wherein the management information includes a tag in the XML file which instructs to overlay predetermined characters superimposed on the document, such that a printer at a client makes a hard copy of the retrieved document including the overlaid characters, when copying is selected at the client, when the document is determined to be printed according to importance degree thereof, and when the management information includes the tag in the XML file, and
   the management information includes information related to a security level corresponding to each of the plurality of documents, and said server displays a warning message coping permitted or copying inhibited of document according to the security level, and the security level is dependent upon a pertinence determination level based on a predetermined rule.

6. The document retrieving device according to claim 5; wherein the management information includes information indicating a collection of a plurality of documents in a same layer and a version number of each of the plurality of documents, and a plurality of documents on the same layer in a specified version number are retrieved from the document database based on the management information, by accessing from said server the collection of the plurality of documents.

7. The document retrieval device according to claim 5, wherein the management information includes information related to a security level corresponding to each of the plurality of documents, and the documents are retrieved from the document database according to a permission of retrieval corresponding to the security level.

8. A computer-readable recording medium storing document retrieval instructions used in an integrated document management system, which, when executed by a computer, causes the computer to function as:
   a storage unit which stores therein a document database comprising a plurality of documents that are files together forming a hierarchical structure comprising an upper hierarchy layer and a lower hierarchy layer ranked below the upper hierarchy layer where document files, each containing a document, in the lower hierarchy are referenced above in the upper hierarchy layer, where the structure is defined with hypertext described in an extensible markup language (XML);
   a management information database comprising management information comprising an XML file defining the hierarchical structure by indicating a relation between a document in the upper hierarchy layer and a document in the lower hierarchy layer, a document type definition file describing information on a version number of each document, and a document style sheet file defining a style of each document, where the document in the upper hierarchy layer is separate and distinct from the document in the lower hierarchy layer; and
   a server connected to the storage unit and provided with a manager of the documents, the document retrieval instructions retrieving together, based on the management information, both the document in the upper hierarchy layer and the document in the lower hierarchy layer in a specified version number, from the document database;
   wherein the management information includes a tag in the XML file which instructs to overlay predetermined characters superimposed on the document, such that a printer at a client makes a hard copy of the retrieved document including the overlaid characters, when copying is selected at the client, when the document is determined to be printed according to importance thereof, and when the management information includes the tag in the XML file, and
   the management information includes information related to a security level corresponding to each of the plurality of documents, and said server displays a warning message coping permitted or copying inhibited of document according to the security level, and the security level is dependent upon a pertinence determination level based on a predetermined rule.

9. The computer-readable recording medium with a document retrieval program recorded therein according to claim 8; wherein the management information includes information indicating a collection of a plurality of documents in a same layer and a version number of each of the plurality of documents, and in the step described above, a plurality of documents on the same layer in a specified version number are retrieved from the document database according to the management information by accessing said server.

10. The computer-readable recording medium with a document retrieval program recorded therein according to claim 8, wherein the management information includes information related to a security level corresponding to each of the plurality of documents, and in the step described above, the documents are retrieved from the document database according to a permission of retrieval corresponding to the security level.

* * * * *